(12) United States Patent
Amadio et al.

(10) Patent No.: US 11,796,810 B2
(45) Date of Patent: Oct. 24, 2023

(54) INDICATION OF PRESENCE AWARENESS

(71) Applicant: MICROSOFT TECHNOLOGY LICENSING, LLC, Redmond, WA (US)

(72) Inventors: Louis Amadio, Sammamish, WA (US); Torsten Stein, Redmond, WA (US); Li Hou, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 685 days.

(21) Appl. No.: 16/579,704

(22) Filed: Sep. 23, 2019

(65) Prior Publication Data

US 2021/0026136 A1 Jan. 28, 2021

Related U.S. Application Data

(60) Provisional application No. 62/877,759, filed on Jul. 23, 2019.

(51) Int. Cl.
*G02B 27/01* (2006.01)
*G05D 1/02* (2020.01)
(Continued)

(52) U.S. Cl.
CPC ....... *G02B 27/0103* (2013.01); *G03H 1/0005* (2013.01); *G05D 1/0214* (2013.01);
(Continued)

(58) Field of Classification Search
CPC ........ G02B 27/0103; G02B 2027/0105; G03H 1/0005; G03H 2001/0061; G05D 1/0214;
(Continued)

(56) References Cited

U.S. PATENT DOCUMENTS

| 9,984,579 B1* | 5/2018 | Harris | ..................... H04L 51/20 |
| 2002/0111988 A1* | 8/2002 | Sato | ....................... B25J 9/1676 |
| | | | 709/217 |

(Continued)

FOREIGN PATENT DOCUMENTS

| CN | 105234950 A | * | 1/2016 | ............ B25J 11/009 |
| JP | 2014104513 A | * | 6/2014 | |
| WO | WO-2020131101 A1 | * | 6/2020 | ............. E05F 15/71 |

OTHER PUBLICATIONS

English Translation JP2014104513 (Year: 2014).*

(Continued)

*Primary Examiner* — Rachid Bendidi
(74) *Attorney, Agent, or Firm* — Han Gim; Newport IP, LLC

(57) ABSTRACT

One or more signals are received from one or more sensors. Based at least in part on the one or more signals, a location of a person relative to one or more locations of an autonomous self-moving device is determined. Based at least in part on the one or more signals, data indicative that the autonomous self-moving device has detected a presence and location of the person is generated. Based at least in part on the one or more signals, a location of a person relative to a location of the autonomous self-moving device is determined. A planned path for the autonomous self-moving device is determined. Based at least in part on the one or more signals, data indicative of the planned path is generated.

14 Claims, 10 Drawing Sheets

(51) Int. Cl.
    *G03H 1/00*     (2006.01)
    *G06F 3/01*     (2006.01)
    *G06V 40/10*    (2022.01)

(52) U.S. Cl.
    CPC ......... *G05D 1/0238* (2013.01); *G05D 1/0274* (2013.01); *G06F 3/011* (2013.01); *G06V 40/10* (2022.01); *G02B 2027/0105* (2013.01); *G03H 2001/0061* (2013.01)

(58) Field of Classification Search
    CPC .... G05D 1/0238; G05D 1/0274; G06F 3/011; G06F 3/016; G06V 40/10; G06V 20/58; B25J 19/06; B25J 9/1676; B25J 5/00; G05B 2219/40202
    See application file for complete search history.

(56) References Cited

U.S. PATENT DOCUMENTS

| | | | |
|---|---|---|---|
| 2014/0031981 A1* | 1/2014 | Fernando | G05D 1/0274 700/253 |
| 2018/0009118 A1* | 1/2018 | Yamaga | G10L 15/22 |
| 2018/0077860 A1 | 3/2018 | Einecke et al. | |
| 2020/0050173 A1* | 2/2020 | Scherer | G06V 40/28 |

OTHER PUBLICATIONS

English translation for CN105234950A (Year: 2016).*
"International Search Report and Written Opinion Issued in PCT Application No. PCT/US20/038002", dated Sep. 17, 2020, 13 Pages.

* cited by examiner

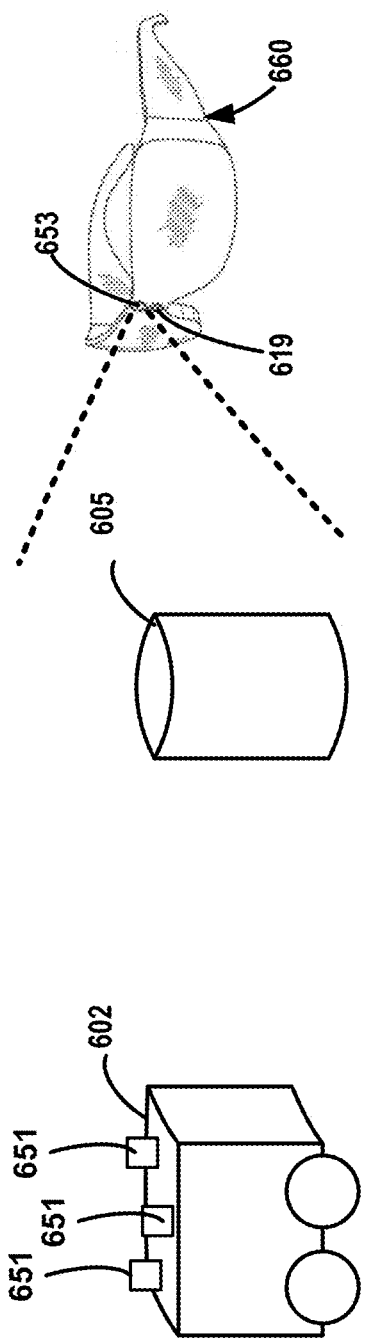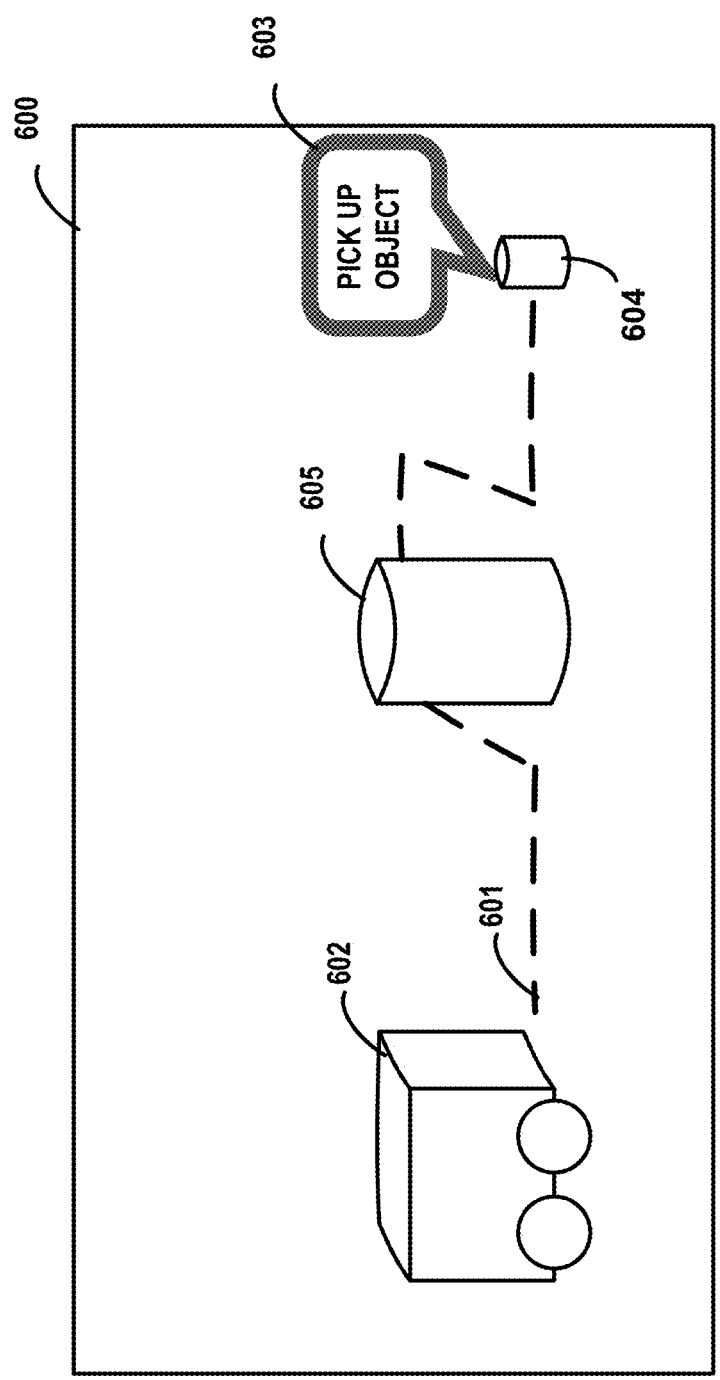
FIG. 6A
FIG. 6B

INDICATION OF PRESENCE AWARENESS

PRIORITY APPLICATION

This application claims the benefit of and priority to U.S. Provisional Application No. 62/877,759, filed Jul. 23, 2019, entitled "Indication of Presence Awareness." the entire contents of which are incorporated herein by reference.

BACKGROUND

Autonomous devices such as mobile robots and autonomous vehicles need to be able to operate within an environment where the devices need to avoid obstacles, perform tasks, identify paths from one location to another, etc. In addition, when working with such autonomous devices, it may be difficult to determine what the autonomous device is planning and what the autonomous devices may or may not understand about their surroundings.

It is with respect to these and other considerations that the disclosure made herein is presented.

SUMMARY

In many environments, humans and autonomous device interactions are becoming increasingly common, and humans and autonomous devices are operating in closer proximity. As humans and autonomous devices are operating in environments where they are physically proximate, such as in a factory or warehouse, the need for new techniques for human/autonomous device interaction are increasingly needed.

For example, close physical proximity may raise the need for humans and robots to interact safely and without causing undue stress or anxiety to humans. One of the challenges in this interaction is for the human to be able to know if the robot will interact with the human in a safe and predictable manner. One aspect of this interaction is for the human to know that the robot is aware of the human's presence. By having the knowledge that the robot is aware of the human, the human's concerns about the robot can be mitigated. For example, a person can assume that the robot will act in an appropriate manner to avoid interacting with the person in a harmful or unwanted manner. Furthermore, persons need to be aware of the next actions that the robot will take to determine if the robot is taking measures to avoid the person or whether they may be in a potential collision or other undesired interaction.

In some implementations, robots might communicate a human interaction mode via a single visual signal or by stopping movement. However, this may be insufficient to inform the human that the robot is aware of the human and that the robot is aware of the human's position relative to the robot and therefore is able to avoid coming into contact with the human. In some embodiments, a visual indicator on the robot may indicate to the human that the robot has recognized the presence of the human. In one embodiment, the indicator may include a further indication of the determined direction or position of the human which can indicate that the robot has recognized a particular human and not a different human. In some embodiments, the visual indicator can communicate indications of multiple directions or positions simultaneously to provide awareness indications to multiple persons around the robot. Additionally, the visual indicator may incorporate distance information through, for example, the use of different colors.

In some embodiments, a visual projector on the robot may be used to indicate the path in the shared space that the robot intends on taking. Nearby persons can thus avoid crossing this path to avoid interaction with the robot. A projection of the robot's intended path may also allow persons to see if the robot has reacted to the persons' presence by visually indicating the presence of the persons in its path, or if the robot projects a new operational path to avoid the persons.

Concepts and technologies are described herein for providing indications of awareness for autonomous devices. Generally described, configurations disclosed herein can augment the functionality of an autonomous device, such as a robot, with resources for understanding an environment and objects around the autonomous device. The resources can be configured to identify the location and other parameters of the environment and objects in the environment. Data generated by the resources can be used to generate indications that the autonomous device has detected the presence of a person and that the autonomous device will take a path that avoids the person.

By the use of the techniques disclosed herein, an autonomous device such as a robot can understand and navigate through an environment that includes humans and thus enable more efficient operational environments where both humans and autonomous devices must be present.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The Detailed Description is described with reference to the accompanying FIGS. In the FIGS., the left-most digit(s) of a reference number identifies the FIG. in which the reference number first appears. The same reference numbers in different FIGS. indicate similar or identical items.

FIG. 6A is a diagram showing aspects of a system according to one embodiment disclosed herein;

FIG. 6B is a diagram showing aspects of a system according to one embodiment disclosed herein;

DETAILED DESCRIPTION

Figure 1:
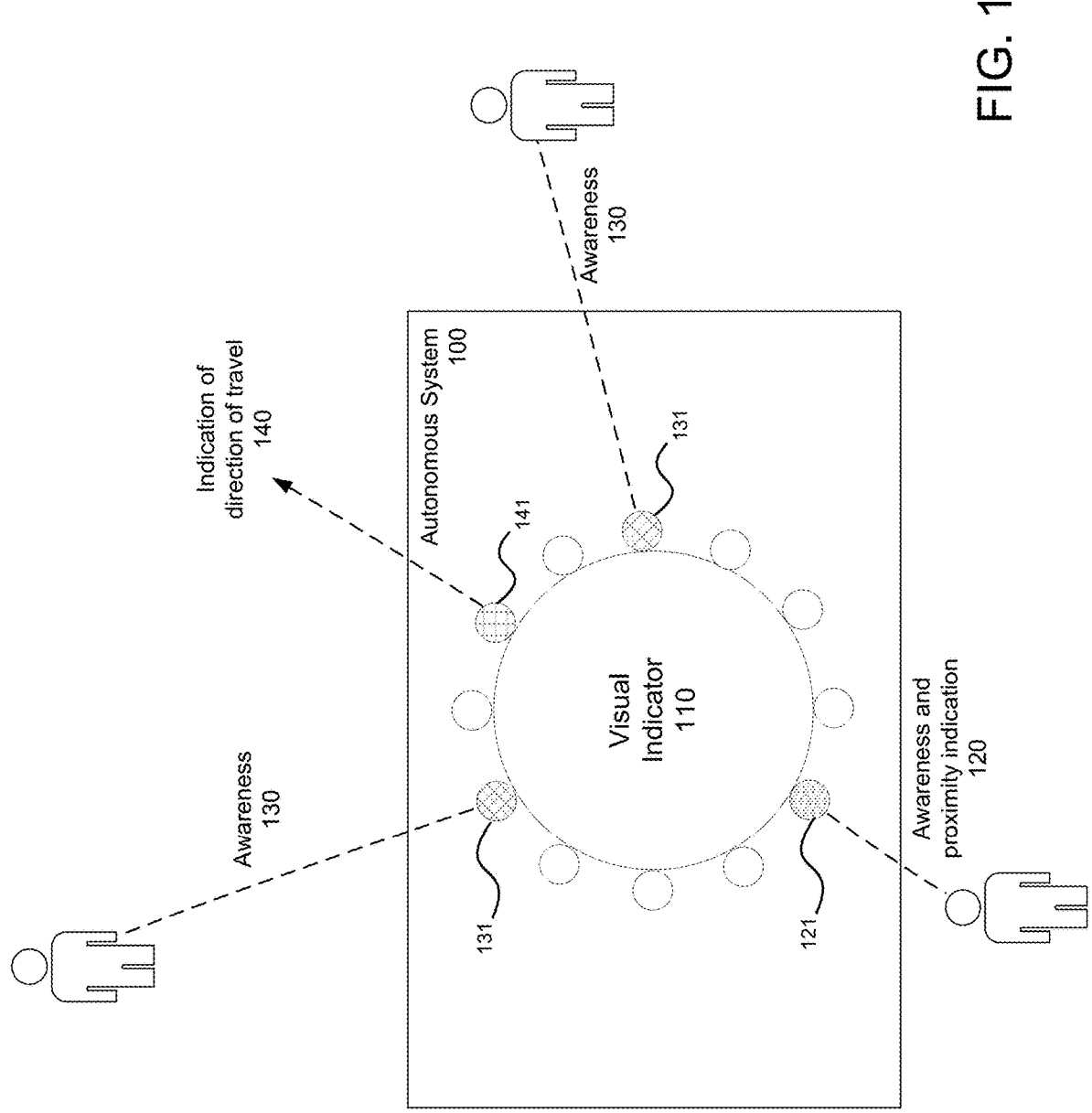
FIG. 1 is a diagram showing aspects of a system according to one embodiment disclosed herein.

As summarized above, when a person is in the vicinity of one or more autonomous devices such as a robot, it may be difficult to determine what the autonomous device is planning and what it may or may not understand about its surroundings. Technologies and techniques provided herein enable an autonomous device to provide an indication of awareness by the autonomous device of persons in the vicinity of the autonomous device.

It should be appreciated that the above-described subject matter may be implemented as a computer-controlled apparatus, a computer process, a computing system, or as an article of manufacture such as a computer-readable storage medium. While the examples described herein are illustrated in the context of robots, it should be understood that the described principles can be implemented with any type of autonomous moving or self-moving device such as an autonomous vehicle. These and various other features will be apparent from a reading of the following Detailed Description and a review of the associated drawings. Furthermore, the claimed subject matter is not limited to implementations that solve any or all disadvantages noted in any part of this disclosure.

While the subject matter described herein is primarily presented in the general context of techniques for providing awareness indication by autonomous devices, it can be appreciated that the techniques described herein may apply to any type of device with a sensor and/or any type of device embodying the sensors. As will be described in more detail herein, it can be appreciated that implementations of the techniques and technologies described herein may include the use of solid state circuits, digital logic circuits, computer component, and/or software executing on one or more devices. Signals described herein may include analog and/or digital signals for communicating a changed state, movement and/or any data associated with motion detection.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific configurations or examples. Referring now to the drawings, in which like numerals represent like elements throughout the several figures, aspects of a computing system, computer-readable storage medium, and computer-implemented methodologies for providing enhanced control of one or more robots. As will be described in more detail below with respect to FIGS. 1-10, there are a number of applications and services that can embody the functionality and techniques described herein.

When a person is in close proximity to an autonomous device such as a robot, the person may want to have the assurance that the autonomous device has sensed the presence of the person. This awareness may help assure the person that the autonomous device may take suitable actions to account for the presence of the person, such as avoiding moving through the location of the person and otherwise taking into account the presence of the person when the autonomous device is performing actions. A person typically wants some indication from the autonomous device that the person's presence is acknowledged, similar to when a first person is approached by a second person who is looking down at a phone, in which the first person may desire an indication that the second person has become aware of the first person's presence, such as the second person looking up and at the first person, or even speaking a greeting from the second person to the first person.

Various embodiments are described for an autonomous device such as a robot to indicate to a person that the autonomous device has detected presence of the person.

In one embodiment, an awareness indication may be sent to a device worn on the person. In an embodiment, the indication may be a haptic indication generated on a watch or other device worn by the person. In another embodiment, the awareness indication may be provided to a person by a visual and/or audio indication provided by the robot. In one embodiment, the indication may be indicated by an LED ring on the robot.

In another embodiment, the awareness indication may be provided to a person by a projection generated by the robot that indicates that the robot has perceived the presence of the person. For example, the projection may include a representation of the person and may further include an indication highlighting the representation.

In another embodiment, the awareness indication may be provided to a person by a holographic image generated on a device used by the person such as an AR or VR device. The holographic image may include an indication that the robot has perceived the presence of the person. For example, the holographic image may include a representation of the person and may further include an indication highlighting the representation.

In some embodiments, the robot may further provide an indication showing the robot's intended path. In one embodiment, a directional indication may be sent to a device worn on the person. In an embodiment, the directional indication may be an indication generated on a watch worn by the person. For example, the watch may include a directional indicator such as a light, an arrow, or other indication of the intended direction of the robot.

In another embodiment, the directional indication may be provided to a person by a visual and/or audio indication provided by the robot. In an embodiment, the directional indication may be indicated by an LED ring on the robot. For example, an LED may be activated that shows the intended direction of travel for the robot. To distinguish from the awareness indication, the directional indication may be a different color and/or may be periodically activated or use some other pattern.

In another embodiment, the directional indication may be provided to a person by a projection generated by the robot that indicates the path that the robot intends to take. The directional indication may further include a representation of the person.

In another embodiment, the directional indication may be provided to a person by a holographic image generated on a device used by the person such as an AR or VR device. The holographic image may include a representation of the person and may further include an indication highlighting the representation.

Referring to FIG. 1, illustrated is one example of a visual indication provided by a robot that includes visual indicators. An autonomous system 100 may have a visual indicator 110 that may include a ring of indicators such as LEDs or other light emitting devices. In an embodiment, the indicator that is closest to the direction of a person may be activated. As shown in FIG. 1, indicators 131 may be illuminated to indicated awareness of proximate persons 130.

Furthermore, the visual indicator may provide an additional indication 121 (such as a different color) that indicates that the robot is aware of the person who is close to the robot 120. The additional indication 121 that the person is closer to the robot can be determined based on a distance threshold. In other embodiments, the additional indication may be activated for the person that is closest when there is more than one person, or when a person is approaching the robot at a rate that exceeds a speed threshold.

In some embodiments, a directional indication 141 may be activated using a different color or pattern from the awareness indication or the proximity indication. The directional indication may be activated to indicate the intended direction of travel 140. For example, in an LED ring, the LED that is closest to the intended direction of travel may be activated. When the robot is turning, the activated LED may change such that the activated LED is closest to the direction of travel. In some embodiments, the indication may be adjusted based on a determined distance to the person. The adjustment may include changing the brightness, changing the rate that the indication blinks or flashes, changing the type and/or intensity of haptic feedback, and the like. The adjustment may be proportional to the proximity of the person, therefore providing an indication to the person that the robot has not only detected the person but is aware of its proximity to the person.

Figure 2:
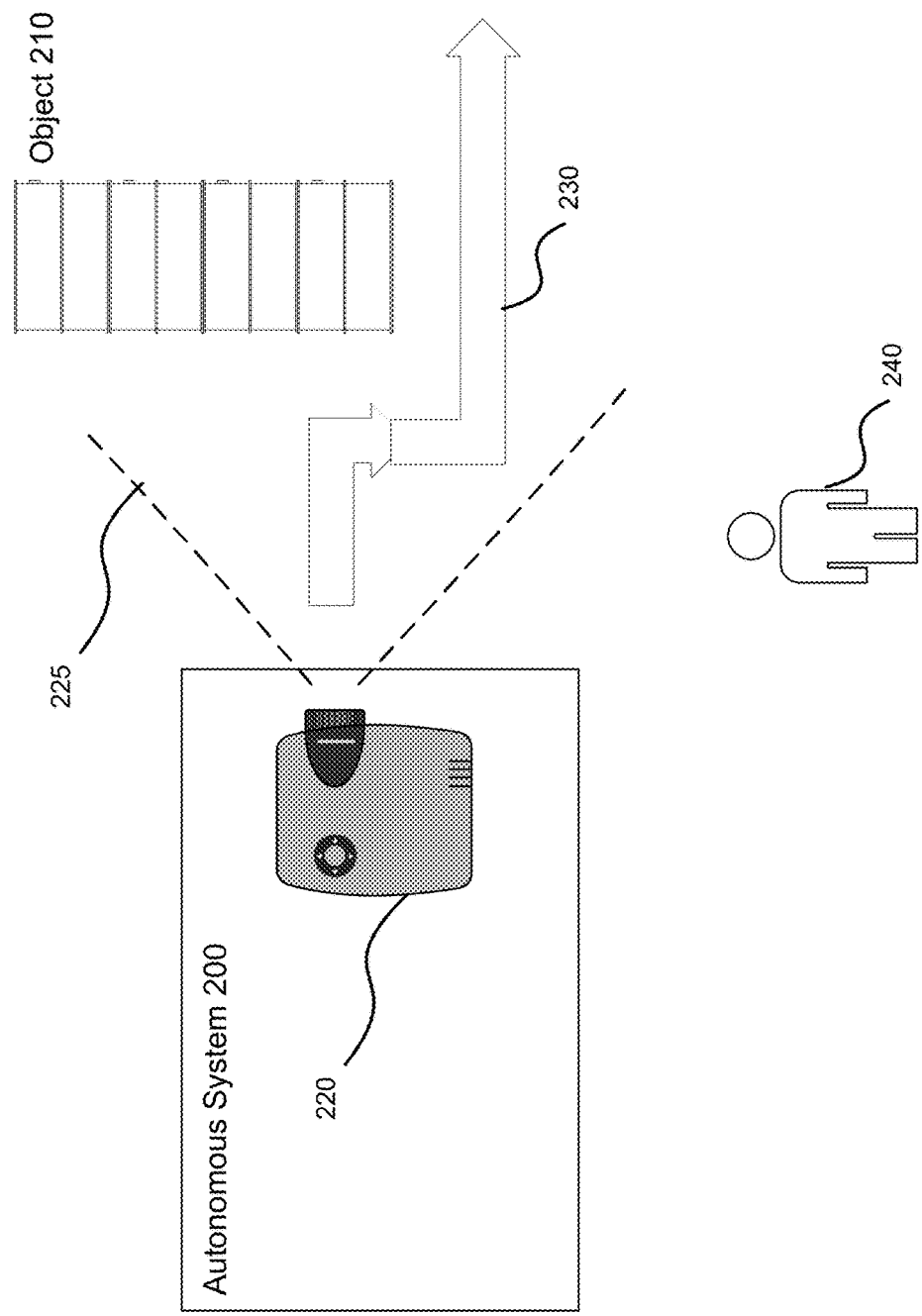
FIG. 2 is a diagram showing aspects of a system according to one embodiment disclosed herein.

Referring to FIG. 2, illustrated is one example of a visual indication provided by an autonomous system 200 that includes a projection 225 of the intended path of the autonomous system 200 using a projection device 220. The projected path 225 can include a path 230 around obstacles such as object 210. Obstacles may include other persons, stationary objects, vehicles, and the like.

Figure 3:
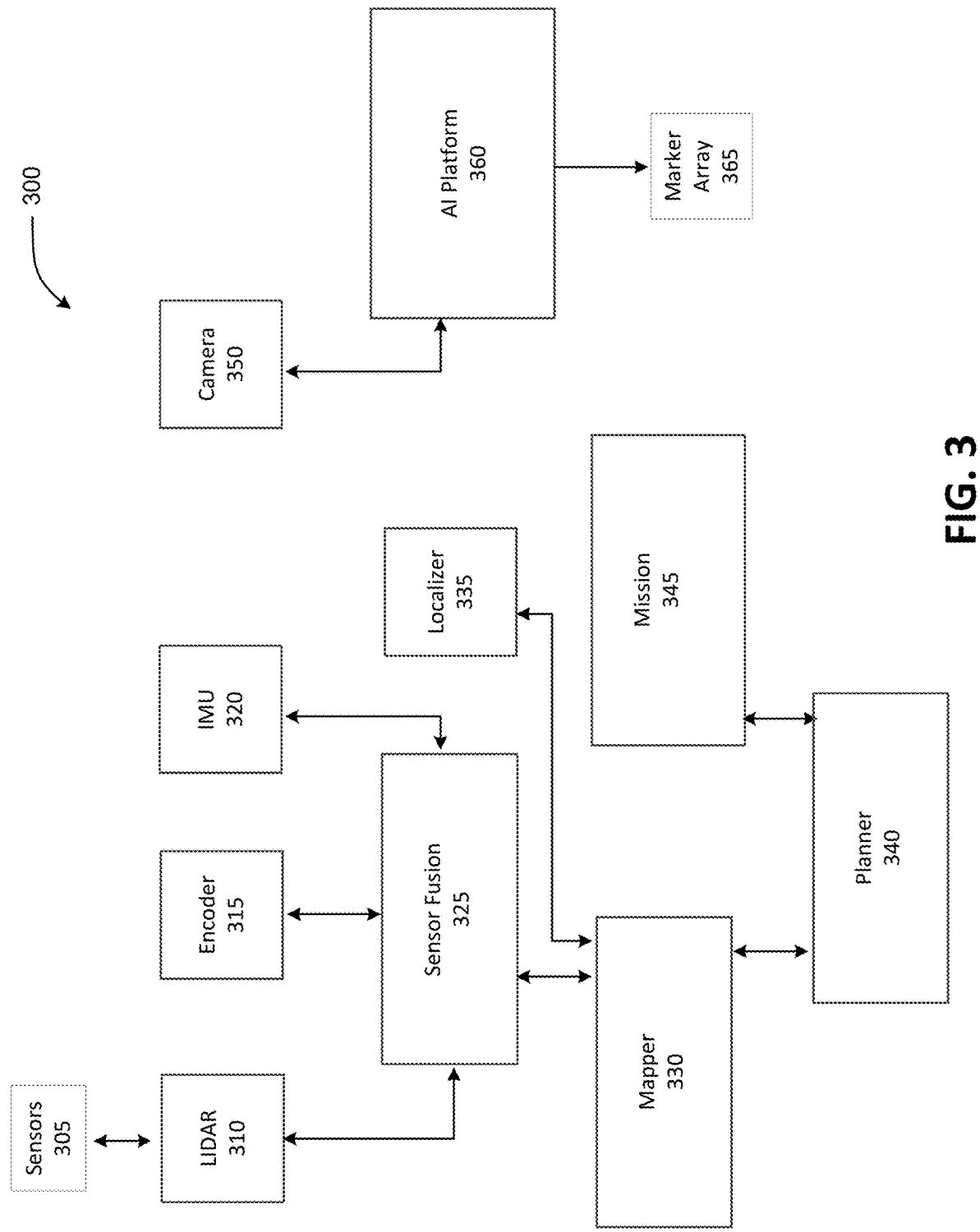
FIG. 3 is a diagram showing aspects of a system according to one embodiment disclosed herein.

FIG. 3 illustrates an example robot build model 300 including a robot operating system (ROS). Such a robot build model provides a way to build applications for robots. The ROS may provide one or more software frameworks for building the applications. It should be understood that environments other than ROS may be implemented to provide a framework for building the applications. A robot is typically configured to receive multiple inputs simultaneously and asynchronously. For example, multiple sensors and devices may be generating data that is processed.

Referring to FIG. 3, the robot build model 300 may be configured to receive sensor inputs from one or more sensors 305. The robot build model 300 may further be configured to receive inputs from a Light Detection and Ranging (LIDAR) 310 which uses pulsed laser to measure distance. Other inputs may be provided by an encoder 315 and an inertial measurement unit (IMU) 320. The various sensor inputs may be processed to provide navigation and localization for the robot.

In an embodiment, the sensor information may be processed by a sensor fusion function 325. A mapper 330 may be configured to generate a map of the robot's surroundings. A localizer 335 may be configured for the robot to localize itself in the map. A planner 340 may be configured to generate a sequence of actions that allows the robot to complete a mission 345, such as moving from a first point to a second point.

In an embodiment, a camera handler 350 may be implemented to process one or more camera inputs. An AI framework 360 that includes an inferencing function such as the Windows AI Platform may be implemented to receive and process camera and other input and identify the environment and determine objects within the environment such as people, chairs, walls, doors, and the like. The position and orientation of the objects can be determined relative to a coordinate system, and the position and orientation may be referred to as the pose. The robot may use the pose to manipulate an object, avoid running into the object, etc. In some implementations, the pose may be published as a marker array 365 which indicates the position and orientation of an object as determined from the perspective of the robot. The planner 340 may, for example, create a plan to manipulate an object.

In an embodiment, a bounding box or bounding area may be generated for what is identified as a person. The bounding area may be used to generate an output that can be provided to an LED ring, output to a wearable device to generate a haptic output, etc. When generating an output to a wearable device, the person associated with the wearable device may be localized by the robot. A union may be generated based on the mapping created by the robot and the map that is localized to the wearable device. Each wearable device may have its own perception of space.

In some embodiments, a spatial anchor service may be implemented that is configured to generate points of interest that may referred to as spatial anchors. The spatial anchor service may further be configured to receive localization models associated with different devices, translate localization models between the devices, and merge the localization models into a unified model. Each device may report where it is in space, and the spatial anchor service may merge the localization models of the different devices. The anchor may be localized, and the unified model can allow for a view of all relevant devices from a single perspective.

In some embodiments, a mapping service with indoor mapping capability may be implemented that interacts with the spatial anchor service. Wearable devices may triangulate its position using, for example, Wifi, and the indoor mapping service may provide positions to the wearable devices.

In some embodiments, an Internet of Things (IoT) service may be implemented to identify the persons in a given area such as a room. Spatial mapping and spatial anchor services may be used to determine the position of the persons.

In some embodiments, the wearable device can create a connection from wearable device to the robot and obtain the localization data. The wearable device may also subscribe to outputs from the planner and receive the mappings.

In one example of using an LED ring to provide an indication of presence awareness, a ROS node may be created that subscribes to the output of the AI platform, which may be configured to determine which LEDs of the LED ring are proximate to a person. In this example, the position of the camera may be synchronized to the LED ring. A transformation may be performed from the camera to the LED ring.

In one example of using projection to provide an indication of presence awareness, the location and orientation of the projection relative to the robot and the camera may be determined. Based on the location of the projector and the projection surface, distortion due to keystoning may be addressed. The projection may include a circle around the person or other indication.

Figure 4:
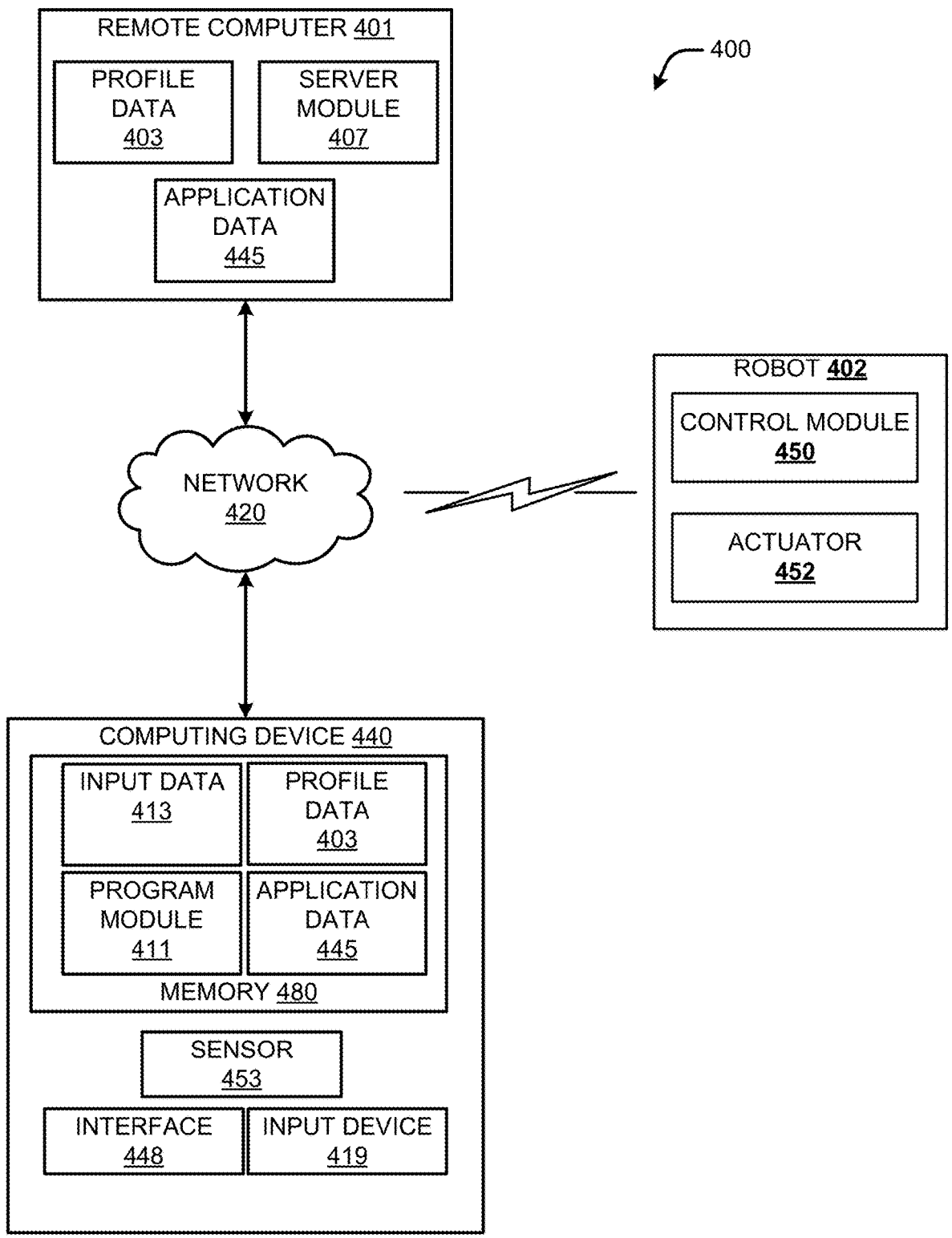
FIG. 4 is a diagram showing aspects of a system according to one embodiment disclosed herein.

FIG. 4 is a system diagram showing aspects of one illustrative mechanism disclosed herein for providing an indication of presence awareness by robots. As shown in FIG. 4, a system 400 may include a remote computer 401, a computing device 140, a robotic device 402, and a network 420. For illustrative purposes, the robotic device 402 is also referred to herein as a "robot 402" or a "second computing device 402." It should be understood that some or all of the functions and components associated with robotic device 402 and computing device 140 may be implemented on a single device or multiple devices.

The computing device 140 may operate as a stand-alone device, or the computing device 140 may operate in conjunction with other computers, such as the remote computer 401. As can be appreciated, the remote computer 401, the robot 402 and the computing device 140 are interconnected through one or more local and/or wide area networks, such as the network 420. In addition, the robot 402 may be in communication with the computing device 140 and other computers by the use of one or more components. For instance, the robot 402 may be equipped with one or more light sources, and the computing device 140 may include one or more sensors, including a camera, for detecting the location of the robot 402. As will be described in more detail below, the robot 402 may be configured with light sources, sensors and transmitting devices to facilitate communication with one or more devices. Other wired or wireless communication mechanisms may be utilized to provide communication between one or more components and/or devices shown in FIG. 4 and other components or computers. In some configurations, the robot 402 can also include an input device, a sensor, such as a camera, or other devices for generating image data or input data 413. Any data obtained or generated by the robot 402 can be communicated to another computer or device, such as the computing device 140 or remote computer 401. It should be appreciated that many more network connections may be utilized than illustrated in FIG. 4.

The computing device 440 may be in the form of a personal computer, a wearable computer, including an HMD, or any other computing device having components for causing a display of one or more images on a display, such as an interface 448. In some configurations, the interface 448 may be configured to cover at least one eye of a user. In one illustrative example, the interface 448 may include a screen configured to cover both eyes of a user. The system 400 or aspects of the system 400 may generate one or more images for generating a stereoscopic view of one or more objects. The computing device 440 may comprise a sensor 453, such as a sonar sensor, a depth sensor, infrared sensor, heat sensor, touch sensor, or any other device or component for detecting the presence, position, and/or characteristics of an object. In addition, the computing device 440 can comprise an input device 419, such as a keyboard, mouse, microphone, or any other device configured to generate a signal and/or data based on any interaction with the computing device 440. For illustrative purposes, signals or data provided by a component, such as the sensor 453 or the input device 419 is referred to herein as input data 413. Input data 413 may also include contextual data or other data received from a computing system, such as the remote computer 401, or a server providing a resource or service.

The interface 448 may be configured to display multiple images from different environments. For example, some configurations of the interface 448 can allow a user to see through selectable sections of the interface 448 enabling the user to view his or her surroundings. For illustrative purposes, the user's perspective looking through the interface 448 is referred to herein as a "real-world view" or a "view" of an object or surrounding environment. As will be described in more detail below, content can be displayed around selected portions of the interface 448 enabling a user to see displayed content along with views of real-world objects observed through the selected portions of the interface 448.

The configurations described herein provide both a "see through display" and an "augmented reality display." For illustrative purposes, the "see through display" may include a transparent lens that can have content displayed on it, and the augmented reality display may include an opaque display that is configured to overlay content over a display of an image, which may be from any source, such as a video feed from a camera used to display a real-world view. For illustrative purposes, some examples disclosed herein describe an overlay of content over a display of an image. In addition, some examples disclosed herein describe techniques that overlay content over a "see through display" enabling a user to see a real-world view with the content. It can be appreciated that all techniques described herein may apply to a "see through display," an "augmented reality display," or variations thereof.

The computing device 440 may include a local memory 480 that stores profile data 403, input data 413, and application data 445. The profile data 403 may store information describing user activity, preferences and other information used for providing control of one or more computing devices, such as a robot. The application data 445 may include output data generated by techniques disclosed herein The computing device 440 may also include a program module 411 configured to manage techniques described herein and interactions between a robot and the computing device 440. For example, the program module 411 may be configured with one or more surface reconstruction algorithms and other algorithms for locating objects and devices. The surface reconstruction algorithms and other algorithms may use data or signals collected from one or more sensors 453, such as a depth sensor attached to the computing device 440.

The remote computer 401 may be in the form of a server computer or a number of server computers configured to store and process the profile data 403, application data 445. The remote computer 401 may also include components, such as the server module 407.

The robot 402 may be equipped with a control module 450 for executing instructions communicated to the robot 402. The robot 402 may have one or more control components, such as an actuator 452. Components of the robot 402, such as the actuator 452, may be configured to generate a physical movement of one or more objects from instructions received by the robot 402. Robot 402 may also comprise a number of motors configured to control the movement of the robot 402.

In some aspects of the disclosure, the computing device 440 detects one or more conditions based on the input data 413 and other data and generates one or more instructions for controlling the robot 402. In some configurations, the computing device 440 obtains input data 413 and other data describing the location and status of the robot 402. In addition, the computing device 440 may obtain and process data indicating a location of the robot 402 relative to the computing device 440.

Any input data 413 received from any resource, such as a remote computer or a sensor, may be used by the computing device 440 to determine the location of any object, the location of the computing device 440 and the location of the robot 402. For instance, the computing device 440 or the robot 402 may include one or more sensors for obtaining depth map data, such as a depth sensor, and other data to identify the location of various objects in a room, including the room boundaries. Configurations disclosed herein can generate data describing geometric parameters of any object or boundary.

Any known technology for identifying the location of one or more objects may be used by the techniques disclosed herein. In one example, data defining the location of the robot 402 or a person may be obtained by the use of an optical sensor, such as a camera or any other sensor 453 or input device 419, and lights or other visual elements mounted on the robot 402. In this illustrative example, multiple LEDs may be mounted on the top of the robot 402. Some LEDs may have different colors to identify a direction of the robot 402. The LEDs can be mounted on the robot 402 at a predetermined distance and predetermined position relative to one another. Any known technology, such as a technology utilizing triangulation techniques, may be used to identify a position and direction of the robot 402 or person. In addition, other technologies can be used to determine a distance between the robot 402 and the person.

These examples are provided for illustrative purposes only and are not to be construed as limiting. Any technology may be used for identifying a location of any computing device or object, which may involve the use of a radio signal, a light-based signal or any signal capable of identifying the location of an object. The computing device 440 may process any input data 413 from any device or resource to identify the location and other contextual information regarding objects or computing devices.

In some configurations, the robot 402 may have one or more sensors for capturing and generating data. In one illustrative example, the robot 402 may be equipped with one or more depth map cameras. The depth map cameras, or any other type of sensor, may collect data describing objects detected by the sensors. In yet another example, the robot 402 may be equipped with a wheel position sensor. Data or a signal generated by such sensors, such as the wheel position sensor, may be used to identify the location, velocity or other information regarding the robot 402. These examples are provided for illustrative purposes only and are not to be construed as limiting. It can be appreciated that a number of sensors or devices may be used to generate/obtain data associated with one or more objects and to identify the location of one or more objects.

The obtained data, such as depth map data, may be then processed by the techniques described herein to identify objects and the location of objects, and to generate and display data associated with the object. In the examples described herein, the data associated with the object is displayed on a user interface with a representation or graphical element that shows an association between the data associated with the object and an object. For illustrative purposes, data that is associated with an object is referred to herein as "attached data" or data that is "attached" to an object. In addition, any obtained data, also referred to herein as input data 413, may be used for generating and modifying instructions for one or more computing devices, e.g., a robot 402. In some configurations, robot 402 can be configured to perform or manage complex navigation and pathfinding tasks for the robot 402.

In some configurations, the computing device 440 interprets input data 413 and/or other data to determine a context with respect to the objects in the room. The computing device 440 may perform one or more functions, such as a depth map analysis and surface reconstruction analysis to identify objects and properties of objects. For instance, certain geometric shapes and other parameters, such as a size of an object, may be used to categorize or characterize individual objects, e.g., an object may be characterized as "furniture," a "high-priority object," or a "primary object." Other data related to objects in an environment may be obtained from databases or other resources.

In some configurations, the techniques disclosed herein may process input data 413 from one or more resources to generate contextual data. The contextual data can be used by techniques described herein to identify a location associated with each identified object. Based on location information, other data, and other properties associated with each object, the techniques disclosed herein can generate instructions for a robot to perform one or more tasks. The generated instructions may be based on the location of the identified objects, such as a computer, geometric data, characteristics of an object, and other contextual information.

To illustrate aspects of the techniques disclosed herein, consider a scenario where the robot 402 is in an environment, e.g., a room, with other objects. A user wearing a head-mounted display may be standing in the room with the other objects and the robot 402. Sensors 453 and input devices 419 mounted to the head-mounted display can generate signals or data associated with the robot 402 and the other objects. For instance, the signals or data can be processed by one or more methods, such as technologies involving triangulation algorithms, to identify the location of the objects and/or the robot 402. Other input data 413 may be received and processed with the signals or data to identify the location of the objects and/or the robot 402 and other parameters, such as the size and shape of the objects and/or the robot 402. Processing can be applied to any received data or signal to identify the location and geometric properties of objects in the room. The obtained information can be used to generate one or more instructions that may be communicated to the robot 402 for execution. The instructions enable the robot 402 to perform one or more tasks, which may involve interaction between the robot 402 and one or more objects in the room.

Figure 5A:
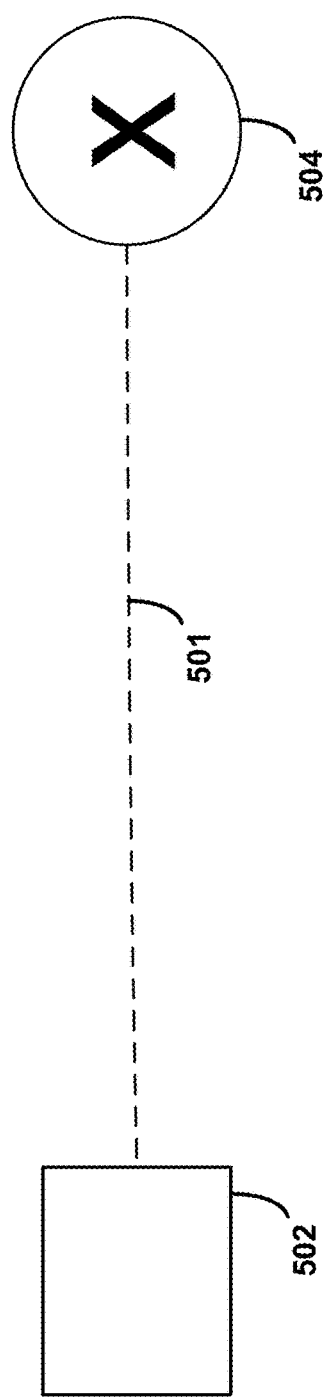
FIG. 5A is a diagram showing aspects of a system according to one embodiment disclosed herein.

With reference to FIG. 5A, a robot 502 may be configured to perform a task associated with an object 504. For example, the robot 502 may interpret various types of data, such as image data, to determine the location of the robot 502 and the location of the object 504. Based on the location of each object, the techniques disclosed herein can generate instructions for the robot 502 to interact with the object 504. In one illustrative example, instructions configured for the robot 502 may cause the robot 502 to follow a path 501 (illustrated with a dashed line in FIG. 5A) the robot 502 may use to navigate to the object 504. In addition, the instructions may cause the robot 502 to pick up the object 504, or perform any other task, which may involve any interaction with the object 504. Instructions configured for the robot 502 may cause the robot 502 to move along a path 501 and perform any number of tasks defined in the instructions, which may include one or more tasks associated with the object 504.

During execution of the instructions, the robot 502 and other devices can also provide feedback information to the computing device 150. The feedback information may be processed to make adjustments or modifications to the generated instruction set. As described above, instructions may be generated, derived or obtained based on any type of input data. This feedback mechanism allows for adjustments to the instructions communicated to the robot 502 as the robot 502 is performing tasks.

Figure 5B:
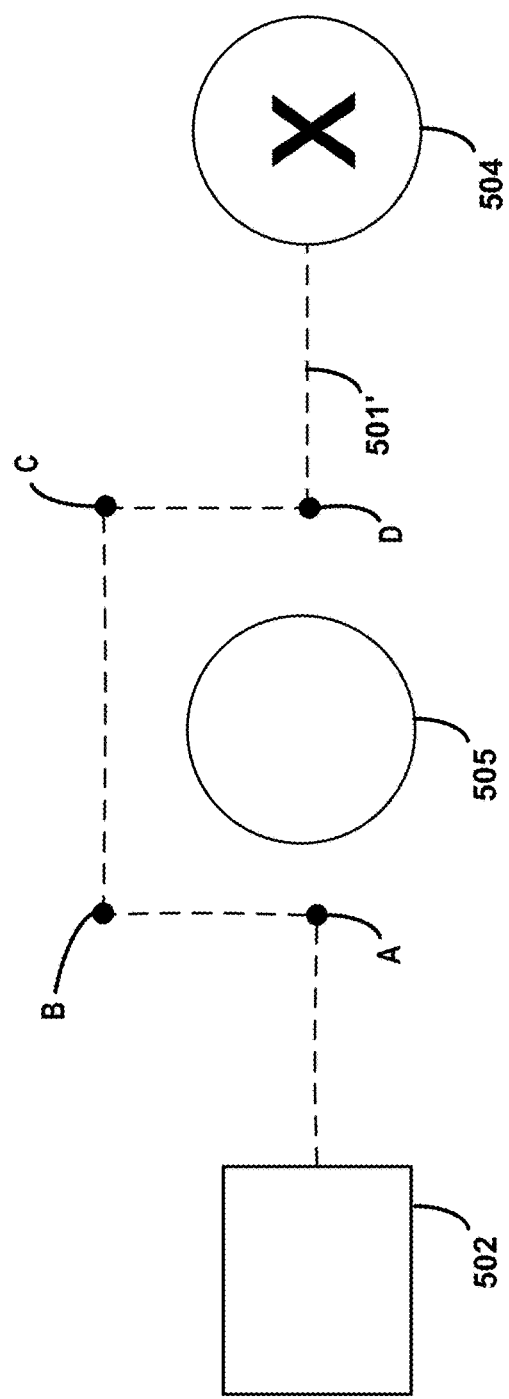
FIG. 5B is a diagram showing aspects of a system according to one embodiment disclosed herein.

FIG. 5B illustrates a scenario where an obstacle 505 is positioned between the robot 502 and the first object 504. Such a scenario may arise if the obstacle 505 has been moved into the position shown in FIG. 5B. As summarized above, techniques described herein enable the robot 502 to adapt to changed circumstances, such as the introduction of the obstacle 505.

By the use of one or more sensors, the location of the robot 502 relative to the obstacle 505 and the object 504 may be determined. Based on a number of parameters, which may include the size and location of the obstacle 505, a set of instructions for the robot 502 may be generated to go around the obstacle 505 and perform one or more tasks associated with the first object 504. In some configurations, the generated instructions may define a modified path 501' (illustrated with a dashed line in FIG. 5B) for the robot 502 to follow. In addition, the instructions may be rule-based. For example, the generated instructions may simply identify objects to avoid. In addition, the instructions may provide specific tasks such as pick up an object, provide information, collect information, etc. For illustrative purposes, instructions generated in response to a changed circumstance or a condition, such as an error or conflict, are referred to as "modified instructions" or "modifications to the instructions." Adjustments to one or more instructions may be made at any point during the execution of the instructions. For instance, with reference to FIG. 5B, input data 113 may be processed at point "A," point "B" or at any other point, to generate new instructions or modify stored instructions.

In other aspects of the present disclosure, the techniques disclosed herein may provide a graphical representation of the instructions and other status data. As summarized herein, it may be difficult for a user to determine what a robot is planning and what the robot may or may not be considering about its surroundings.

One or more projected results from the simulation may be generated as output data, also referred to herein as "model data." The techniques disclosed herein may then generate data defining an animation or rendering of the robot 502 based on the model data. Output data defining a rendering may include an animation or other graphical elements representing the model data.

Referring to the example scenario shown in FIG. 6A, the computing device 660, which is in the form of an HMD, can interact with a robot 602. In this example, the HMD includes an input device 619, which can include a microphone, sonar sensor or any other device for receiving an input caused by an object or user. In addition, the HMD includes a sensor 653, which can include a camera directed, as illustrated by the dashed lines, toward the robot 602, an obstacle 605 or any other object in an environment. As summarized above, the robot 602 may be configured with one or more visual identifiers 651, such as colored lights, for use in detecting the location and direction of the robot 602. Although this example illustrates a configuration with lights, any type of visual identifier or physical characteristic may be used.

It may be difficult for the user to identify the exact path the robot 602 may travel. A graphical display 600, such as the one shown in FIG. 6B, may be displayed to the user wearing the HMD configured with the techniques described herein. The graphical display 600 can include, for example, a representation of the robot 602 and representations of one or more objects, such as the obstacle 605. The instructions may be represented by a number of graphical elements or animations. In the example shown in FIG. 6B, a path 601 to be performed by the robot 602 may be determined and displayed. One example of the path 601 is shown with dashed line shown in FIG. 6B. As shown, the graphical display 600 can include multiple stages, where each sage can represent a task associated with the instructions. Other representations using symbols, text descriptions, graphical elements, or animations can be displayed to show different movements, functions or tasks. In one illustrative example, a graphical display 600 may animate the robot 602 picking up an object, entering data, receiving data or any other function that may be performed by a robot. As shown, a graphical element 603 can involve text with a one or more graphical elements, such as the quote box shown in FIG. 6B, illustrating an association between the text and the object 604.

By showing a graphical representation of a path and other tasks that may be performed by the robot 602, a user may easily understand how the robot will interact with different objects and obstacles.

In some configurations, the graphical representation of the path may be displayed as "mixed reality" or "augmented reality" renderings overlaid on top of the real-world view entirely.

In some configurations, techniques disclosed herein may select sections of interface 600, where the selected sections are configured to be transparent. Such sections provide a user with a real-world view of one or more objects, such as the elements of an environment and the robot 602. The environment may include objects and/or other aspects of the environment, such as walls or boundaries. For illustrative purposes, a mixed environment display can include a display of graphical representations with real-world views of one or more real-world objects. For example, a rendering of a graphical element representing a path of a robot can be displayed in conjunction with a real-world view of the environment and/or objects in the environment.

As summarized above, data describing a status or other information may be attached to one or more components of a robot or other objects. Based on one or more factors, the data may be displayed with a component or object. A graphical element or the arrangement of the data with respect to a component or object may be displayed allowing the user to readily identify how the data is associated with one or more components or objects.

In some configurations, video data and other data captured by sensors or other types of input may be processed to derive contextual information. The contextual information may capture and prioritize movements and actions of a person. The contextual information may be used to determine goals or tasks, such as to pick up an object or to move to a workstation and interact with a computer. The contextual information may also be used to generate a number of instructions which may cause a robot to follow a particular path, direct cameras and move in a particular direction, e.g., following the gaze direction of a user, and other actions.

Any type of input data may be used for these techniques, which may involve the use of location information from a GPS device, a map of an environment received from a remote computer and other contextual data such as the size and shape of an object. The generated instructions may be communicated to a robot, allowing the robot to perform the tasks interpreted by actions of the user wearing the HMD. In the present example, the robot may be configured to follow the user, as the user selects objects, and pick up the selected objects. In some configurations, the instructions may cause the robot to function autonomously without direction from a user.

Figure 7:
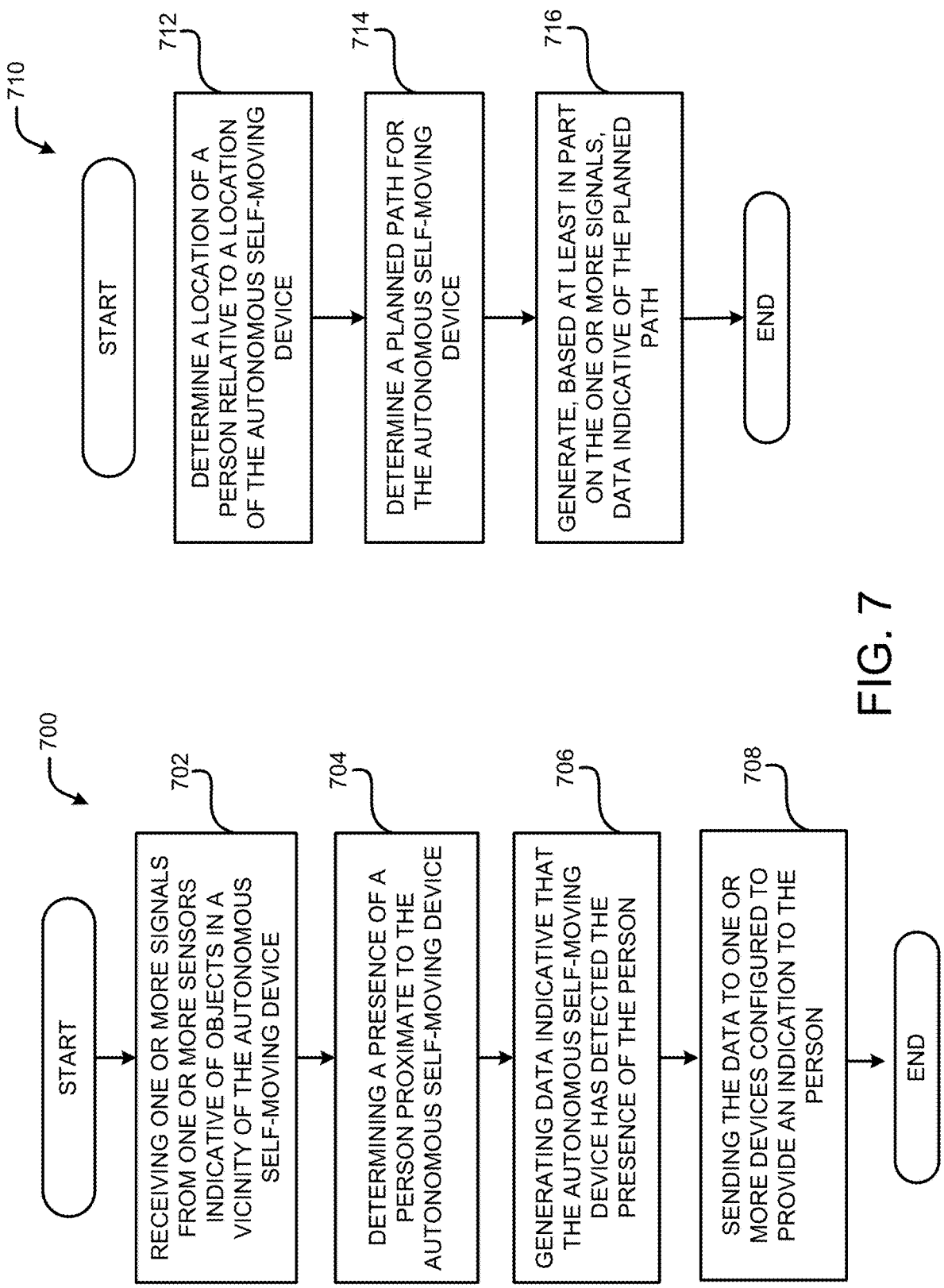
FIG. 7 is a flow diagram showing aspects of two illustrative routines, according to one embodiment disclosed herein.

Turning now to FIG. 7, aspects of a routine 700 and 710 are shown and described below. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can be ended at any time and need not be performed in its entirety. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

As will be described in conjunction with FIG. 8, the operations of the routine 700 and 710 are described herein as being implemented, at least in part, by an application, component and/or circuit, such as the program module 811. Although the following illustration refers to the components of FIG. 8, it can be appreciated that the operations of the routine 700 may be also implemented in many other ways. For example, the routine 700 may be implemented, at least in part, by computer processor or processor of another computer. In addition, one or more of the operations of the routine 700 may alternatively or additionally be implemented, at least in part, by a chipset working alone or in conjunction with other software modules. Any service, circuit or application suitable for providing contextual data indicating the position or state of any device may be used in operations described herein.

Referring to FIG. 7, the routine 700 begins at operation 702, where one or more signals indicative of objects in a vicinity of the autonomous self-moving device are received by an autonomous self-moving device from one or more sensors, Operation 704 illustrates determining, based at least in part on the one or more signals, a presence of a person proximate to the autonomous self-moving device. Operation 706 illustrates generating, based on a distance between a location of the person and a location of the autonomous self-moving device, data indicative that the autonomous self-moving device has detected the presence of the person. Operation 708 illustrates sending the data to one or more devices configured to provide an indication to the person that the autonomous self-moving device has detected the presence of the person.

In an embodiment, the one or more devices is an LED ring, and wherein the data is usable to activate one or more LEDs of the LED ring to indicate the detected presence.

In an embodiment, the one or more devices is a wearable device, wherein the data is usable to activate one or more haptic devices of the wearable device to indicate the detected presence.

In an embodiment, the one or more devices is a projection device configured to render a projection comprising at least a portion of an environment proximate to the autonomous self-moving device, wherein the rendered projection includes an indication of the detected presence.

In an embodiment, the one or more devices is configured to render a holographic image including at least a portion of an environment proximate to the autonomous self-moving device, wherein rendered holographic image includes an indication of the detected presence.

In an embodiment, an autonomous self-moving device is configured to:

receive one or more signals indicative of objects in a vicinity of the autonomous self-moving device;

determine, based at least in part on the one or more signals, a presence of a person proximate to the autonomous self-moving device;

generate an indication that the autonomous self-moving device has detected the presence of the person.

In an embodiment, the autonomous self-moving device is further configured to generate data indicative of an intended path of the autonomous self-moving device.

In an embodiment, the autonomous self-moving device is further configured to determine a presence of a plurality of persons proximate to the autonomous self-moving device; and generate an indication of which of the plurality of persons are within a threshold distance from the autonomous self-moving device.

In an embodiment, the autonomous self-moving device is further configured to determine a presence of a plurality of persons proximate to the autonomous self-moving device;

generate an indication of which of the plurality of persons are within a threshold distance from the autonomous self-moving device; and send data indicative of which of the plurality of persons are within the threshold distance to the one or more devices.

In an embodiment, the one or more devices are configured to provide a first indication that the autonomous self-moving device has detected the presence of the person and a second indication of which of the plurality of persons are within the threshold distance to the one or more devices.

In an embodiment, the indication is generated on an LED ring, and wherein one or more LEDs of the LED ring are activated to indicate the detected presence.

In an embodiment, a brightness of the activated LEDs is adjusted based on a determined distance to the person.

In an embodiment, the one or more devices is a wearable device, wherein the indication comprises data sent to a wearable device, wherein the data is usable to activate one or more haptic devices of the wearable device to indicate the detected presence.

In an embodiment, the indication is provided by a projection device configured to render a projection comprising at least a portion of an environment proximate to the autonomous self-moving device, wherein the rendered projection includes an indication of the detected presence.

In an embodiment, the indication comprises a holographic image including at least a portion of an environment proximate to the autonomous self-moving device, wherein holographic image includes an indication of the detected presence.

In an embodiment, a system comprises:

a memory storing thereon instructions that when executed by a processor of the system, cause the system to perform operations comprising:

receiving, from one or more sensors, one or more signals indicative of objects in a vicinity of the system;

determining, based at least in part on the one or more signals, a presence of a person proximate to the system;

generating, based at least in part on a location of the person and the system, data indicative that the system has detected the presence of the person; and sending the data to one or more devices configured to provide an indication to the person that the system has detected the presence of the person.

In an embodiment, the system is at least a part of an autonomous self-moving device, wherein the system is further configured to generate data indicative of an intended path of the system.

In an embodiment, the system is further configured to:

determine a presence of a plurality of persons proximate to the system; and generate data indicative of which of the plurality of persons are within a threshold distance from the system.

In an embodiment, the system is further configured to:

determine a presence of a plurality of persons proximate to the system;

generate data indicative of which of the plurality of persons are within a threshold distance from the system; and send the data indicative of which of the plurality of persons are within the threshold distance to the one or more devices.

In an embodiment, the one or more devices are configured to provide a first indication that the system has detected the presence of the person and a second indication of which of the plurality of persons are within the threshold distance to the one or more devices.

Referring to FIG. 7, the routine 710 begins at operation 712, where, based at least in part on the one or more signals, a location of a person relative to a location of the autonomous self-moving device is determined. Operation 714 illustrates determining a planned path for the autonomous self-moving device. Operation 716 illustrates generating, based at least in part on the one or more signals, data indicative of the planned path.

Figure 8:
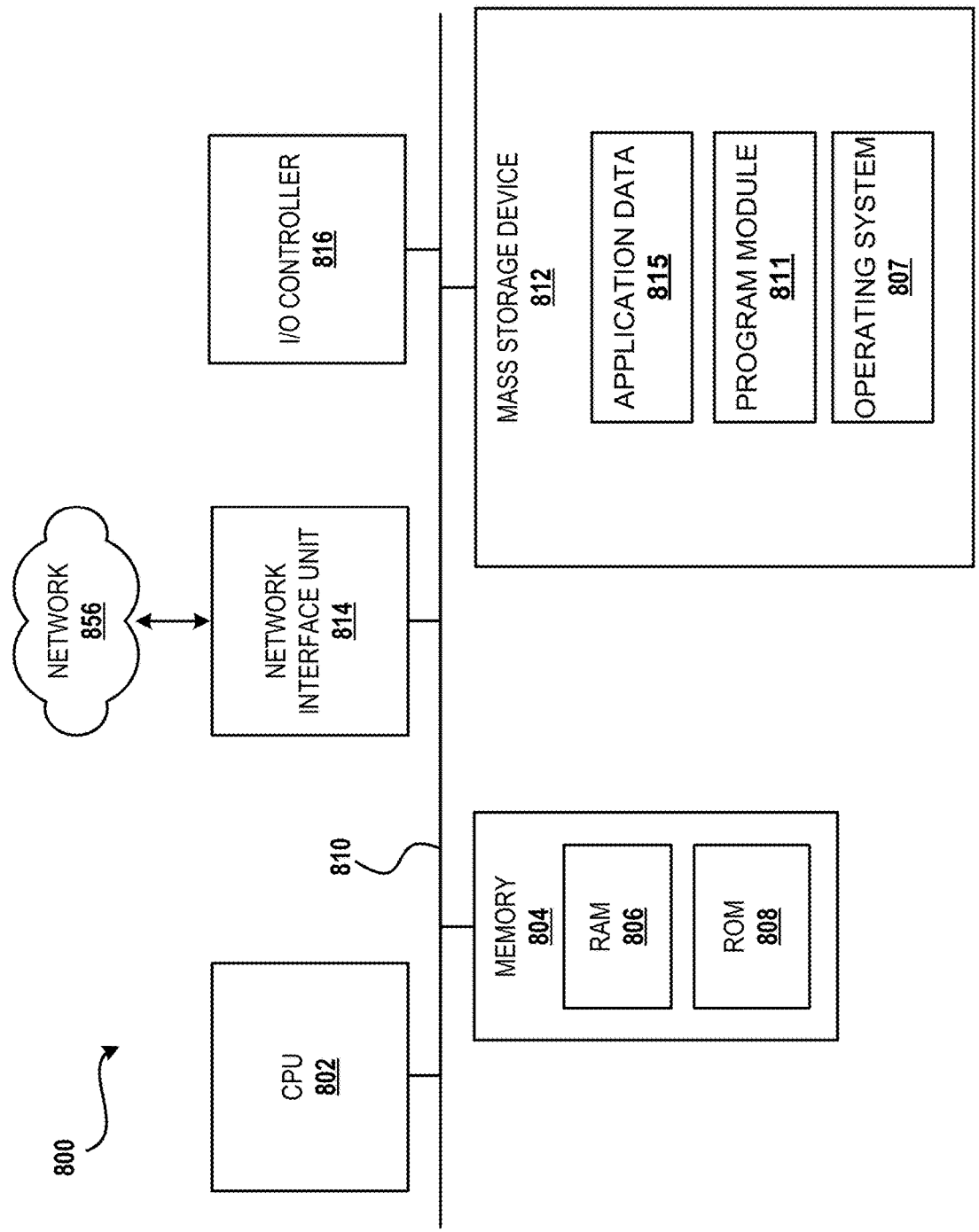
FIG. 8 is a computer architecture diagram illustrating aspects of an example computer architecture for a computer capable of executing the software components described herein.

FIG. 8 shows additional details of an example computer architecture 800 for a computer capable of executing the program components described above. The computer architecture 800 may be utilized to execute any aspects of the software components presented herein.

The computer architecture 800 illustrated in FIG. 8 includes a central processing unit 802 ("CPU"), a system memory 804, including a random access memory 806 ("RAM") and a read-only memory ("ROM") 808, and a system bus 810 that couples the memory 804 to the CPU 802. A basic input/output system containing the basic routines that help to transfer information between elements within the computer architecture 800, such as during startup, is stored in the ROM 808. The computer architecture 800 further includes a mass storage device 812 for storing an operating system 807, and one or more application programs including, but not limited to, a tracking module 105 and contextual data 801.

The mass storage device 812 is connected to the CPU 802 through a mass storage controller (not shown) connected to the bus 810. The mass storage device 812 and its associated computer-readable media provide non-volatile storage for the computer architecture 800. Although the description of computer-readable media contained herein refers to a mass storage device, such as a solid state drive, a hard disk or CD-ROM drive, it should be appreciated by those skilled in the art that computer-readable media can be any available computer storage media or communication media that can be accessed by the computer architecture 800.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 800. For purposes the claims, the phrase "computer storage medium," "computer-readable storage medium" and variations thereof, does not include waves, signals, and/or other transitory and/or intangible communication media, per se.

According to various configurations, the computer architecture 800 may operate in a networked environment using logical connections to remote computers through the network 1056 and/or another network (not shown). The computer architecture 800 may connect to the network 1056 through a network interface unit 814 connected to the bus 810. It should be appreciated that the network interface unit 814 also may be utilized to connect to other types of networks and remote computer systems. The computer architecture 800 also may include an input/output controller 816 for receiving and processing input from a number of other devices, including a keyboard, mouse, or electronic stylus (not shown in FIG. 8). Similarly, the input/output controller 816 may provide output to a display screen, a printer, or other type of output device (also not shown in FIG. 8).

It should be appreciated that the software components described herein may, when loaded into the CPU 802 and executed, transform the CPU 802 and the overall computer architecture 800 from a general-purpose computing system into a special-purpose computing system customized to facilitate the functionality presented herein. The CPU 802 may be constructed from any number of transistors or other discrete circuit elements, which may individually or collectively assume any number of states. More specifically, the CPU 802 may operate as a finite-state machine, in response to executable instructions contained within the software modules disclosed herein. These computer-executable instructions may transform the CPU 802 by specifying how the CPU 802 transitions between states, thereby transforming the transistors or other discrete hardware elements constituting the CPU 802.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 800 in order to store and execute the software components presented herein. It also should be appreciated that the computer architecture 800 may include other types of computing devices, including hand-held computers, embedded computer systems, personal digital assistants, and other types of computing devices known to those skilled in the art. It is also contemplated that the computer architecture 800 may not include all of the components shown in FIG. 8, may include other components that are not explicitly shown in FIG. 8, or may utilize an architecture completely different than that shown in FIG. 8.

Figure 9:
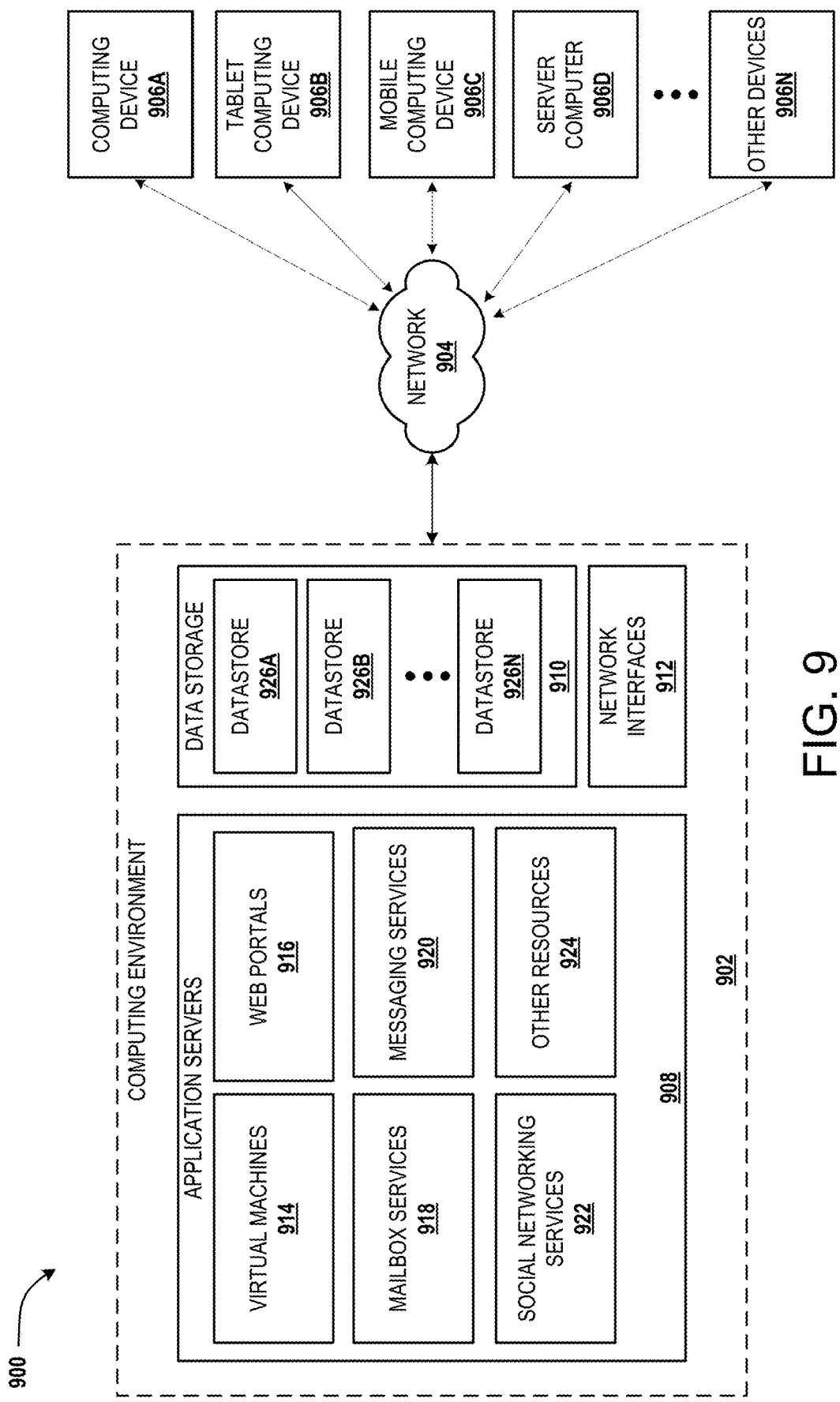
FIG. 9 is a computer architecture diagram illustrating aspects of an example computer architecture for a system according to one embodiment disclosed herein.

FIG. 9 depicts an illustrative distributed computing environment 900 capable of executing the software components described herein. Thus, the distributed computing environment 900 illustrated in FIG. 9 can be utilized to execute any aspects of the software components presented herein. For example, the distributed computing environment 900 can be utilized to execute aspects of the techniques disclosed herein.

According to various implementations, the distributed computing environment 900 includes a computing environment 902 operating on, in communication with, or as part of the network 904. The network 904 may be or may include the network 1056, described above with reference to FIG. 8. The network 904 also can include various access networks. One or more client devices 906A-906N (hereinafter referred to collectively and/or generically as "clients 906") can communicate with the computing environment 902 via the network 904 and/or other connections (not illustrated in FIG. 9). In one illustrated configuration, the clients 906 include a computing device 906A such as a laptop computer, a desktop computer, or other computing device; a slate or tablet computing device ("tablet computing device") 906B; a mobile computing device 906C such as a mobile telephone, a smart phone, or other mobile computing device; a server computer 906D; and/or other devices 906N. It should be understood that any number of clients 906 can communicate with the computing environment 902. Two example computing architectures for the clients 906 are illustrated and described herein with reference to FIGS. 8 and 10. It should be understood that the illustrated clients 906 and computing architectures illustrated and described herein are illustrative, and should not be construed as being limited in any way.

In the illustrated configuration, the computing environment 902 includes application servers 908, data storage 910, and one or more network interfaces 912. According to various implementations, the functionality of the application servers 908 can be provided by one or more server computers that are executing as part of, or in communication with, the network 904. The application servers 908 can host various services, virtual machines, portals, and/or other resources. In the illustrated configuration, the application servers 908 host one or more virtual machines 914 for hosting applications or other functionality. According to various implementations, the virtual machines 914 host one or more applications and/or software modules for providing enhanced control of one or more robots. It should be understood that this configuration is illustrative, and should not be construed as being limiting in any way. The application servers 908 also host or provide access to one or more portals, link pages, Web sites, and/or other information ("Web portals") 916.

According to various implementations, the application servers 908 also include one or more mailbox services 918 and one or more messaging services 920. The mailbox services 918 can include electronic mail ("email") services. The mailbox services 918 also can include various personal information management ("PIM") services including, but not limited to, calendar services, contact management services, collaboration services, and/or other services. The messaging services 920 can include, but are not limited to, instant messaging services, chat services, forum services, and/or other communication services.

The application servers 908 also may include one or more social networking services 922. The social networking services 922 can include various social networking services including, but not limited to, services for sharing or posting status updates, instant messages, links, photos, videos, and/or other information; services for commenting or displaying interest in articles, products, blogs, or other resources; and/or other services. In some configurations, the social networking services 922 are provided by or include the FACEBOOK social networking service, the LINKEDIN professional networking service, the MYSPACE social networking service, the FOURSQUARE geographic networking service, the YAMMER office colleague networking service, and the like. In other configurations, the social networking services 922 are provided by other services, sites, and/or providers that may or may not be explicitly known as social networking providers. For example, some web sites allow users to interact with one another via email, chat services, and/or other means during various activities and/or contexts such as reading published articles, commenting on goods or services, publishing, collaboration, gaming, and the like. Examples of such services include, but are not limited to, the WINDOWS LIVE service and the XBOX LIVE service from Microsoft Corporation in Redmond, Wash. Other services are possible and are contemplated.

The social networking services 922 also can include commenting, blogging, and/or micro blogging services. Examples of such services include, but are not limited to, the YELP commenting service, the KUDZU review service, the OFFICETALK enterprise micro blogging service, the TWITTER messaging service, the GOOGLE BUZZ service, and/or other services. It should be appreciated that the above lists of services are not exhaustive and that numerous additional and/or alternative social networking services 922 are not mentioned herein for the sake of brevity. As such, the above configurations are illustrative, and should not be construed as being limited in any way. According to various implementations, the social networking services 922 may host one or more applications and/or software modules for providing the functionality described herein for providing enhanced control of one or more robots. For instance, any one of the application servers 908 may communicate or facilitate the functionality and features described herein. For instance, a social networking application, mail client, messaging client, a browser running on a phone or any other client 906 may communicate with a networking service 922 and facilitate the functionality, even in part, described above with respect to FIGS. 5-7.

As shown in FIG. 9, the application servers 908 also can host other services, applications, portals, and/or other resources ("other resources") 924. The other resources 924 can include, but are not limited to, document sharing, rendering or any other functionality. It thus can be appreciated that the computing environment 902 can provide integration of the concepts and technologies disclosed herein provided herein with various mailbox, messaging, social networking, and/or other services or resources.

As mentioned above, the computing environment 902 can include the data storage 910. According to various implementations, the functionality of the data storage 910 is provided by one or more databases operating on, or in communication with, the network 904. The functionality of the data storage 910 also can be provided by one or more server computers configured to host data for the computing environment 902. The data storage 910 can include, host, or provide one or more real or virtual datastores 926A-926N (hereinafter referred to collectively and/or generically as "datastores 926"). The datastores 926 are configured to host data used or created by the application servers 908 and/or other data. Although not illustrated in FIG. 9, the datastores 926 also can host or store web page documents, word documents, presentation documents, data structures, algorithms for execution by a recommendation engine, and/or other data utilized by any application program or another module, such as the content manager 105. Aspects of the datastores 926 may be associated with a service for storing files.

The computing environment 902 can communicate with, or be accessed by, the network interfaces 912. The network interfaces 912 can include various types of network hardware and software for supporting communications between two or more computing devices including, but not limited to, the clients 906 and the application servers 908. It should be appreciated that the network interfaces 912 also may be utilized to connect to other types of networks and/or computer systems.

It should be understood that the distributed computing environment 900 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 900 provides the software functionality described herein as a service to the clients 906. It should be understood that the clients 906 can include real or virtual machines including, but not limited to, server computers, web servers, personal computers, mobile computing devices, smart phones, and/or other devices. As such, various configurations of the concepts and technologies disclosed herein enable any device configured to access the distributed computing environment 900 to utilize the functionality described herein for providing enhanced control of one or more robots, a mixed environment display of robotic actions and a display of attached data, among other aspects. In one specific example, as summarized above, techniques described herein may be implemented, at least in part, by the operating system 807 of FIG. 8, which works in conjunction with the application servers 908 of FIG. 9.

Figure 10:
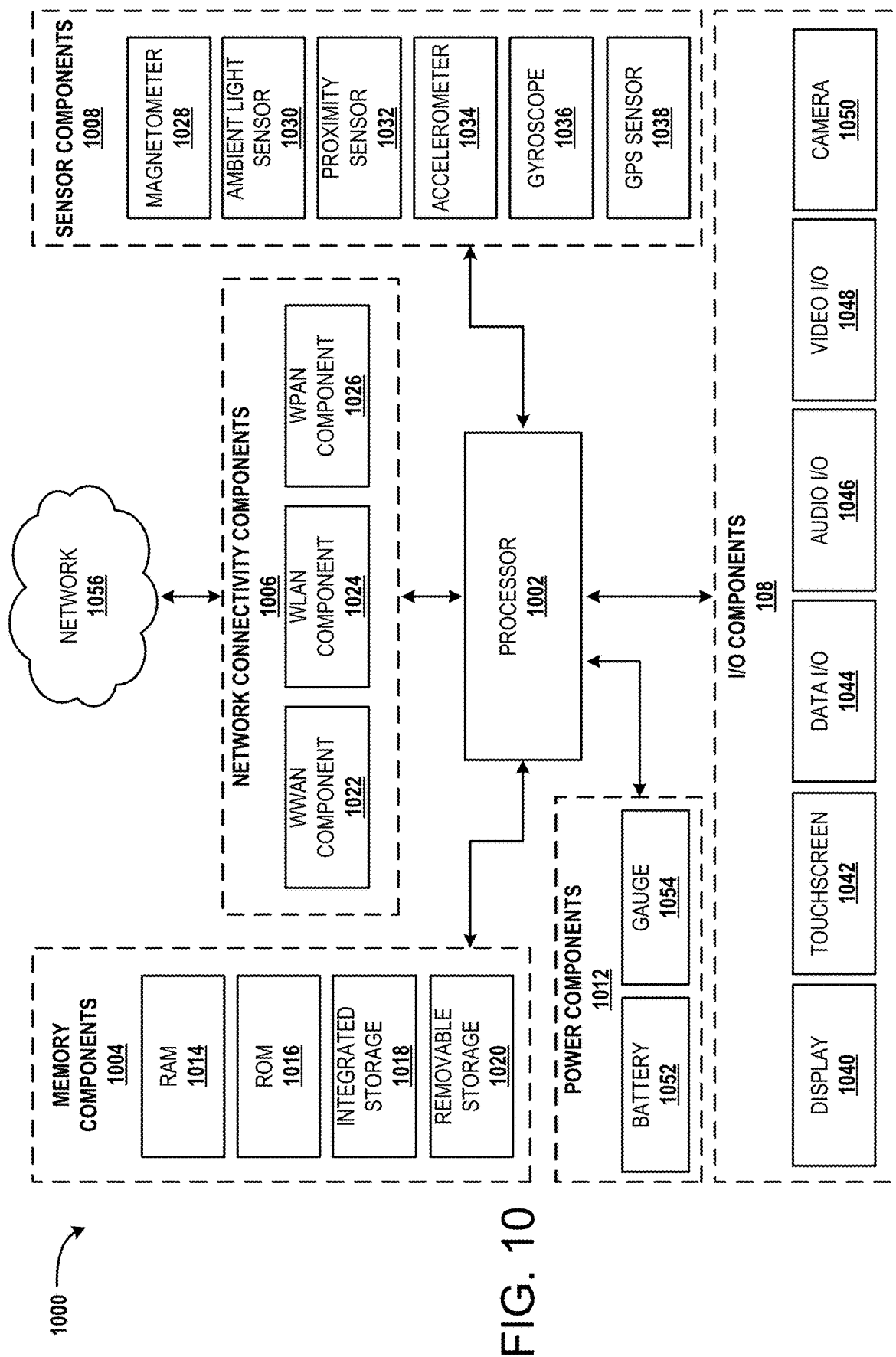
FIG. 10 is a data architecture diagram showing an illustrative example for a system according to one embodiment disclosed herein.

Turning now to FIG. 10, an illustrative computing device architecture 1000 for a computing device that is capable of executing various software components described herein. The computing device architecture 1000 is applicable to computing devices that facilitate mobile computing due, in part, to form factor, wireless connectivity, and/or battery-powered operation. In some configurations, the computing devices include, but are not limited to, mobile telephones, tablet devices, slate devices, portable video game devices, and the like. The computing device architecture 1000 is applicable to any of the clients 806 shown in FIG. 8. Moreover, aspects of the computing device architecture 1000 may be applicable to traditional desktop computers, portable computers (e.g., laptops, notebooks, ultra-portables, and netbooks), server computers, and other computer systems, such as those described herein. For example, the single touch and multi-touch aspects disclosed herein below may be applied to desktop computers that utilize a touchscreen or some other touch-enabled device, such as a touch-enabled track pad or touch-enabled mouse.

The computing device architecture 1000 illustrated in FIG. 10 includes a processor 1002, memory components 1004, network connectivity components 1006, sensor components 1008, input/output components 1010, and power components 1012. In the illustrated configuration, the processor 1002 is in communication with the memory components 1004, the network connectivity components 1006, the sensor components 1008, the input/output ("I/O") components 1010, and the power components 1012. Although no connections are shown between the individuals components illustrated in FIG. 10, the components can interact to carry out device functions. In some configurations, the components are arranged so as to communicate via one or more busses (not shown).

The processor 1002 includes a central processing unit ("CPU") configured to process data, execute computer-executable instructions of one or more application programs, and communicate with other components of the computing device architecture 1000 in order to perform various functionality described herein. The processor 1002 may be utilized to execute aspects of the software components presented herein and, particularly, those that utilize, at least in part, a touch-enabled input.

In some configurations, the processor 1002 includes a graphics processing unit ("GPU") configured to accelerate operations performed by the CPU, including, but not limited to, operations performed by executing general-purpose scientific and/or engineering computing applications, as well as graphics-intensive computing applications such as high resolution video (e.g., 720P, 1080P, and higher resolution), video games, three-dimensional ("3D") modeling applications, and the like. In some configurations, the processor 1002 is configured to communicate with a discrete GPU (not shown). In any case, the CPU and GPU may be configured in accordance with a co-processing CPU/GPU computing model, wherein the sequential part of an application executes on the CPU and the computationally-intensive part is accelerated by the GPU.

In some configurations, the processor 1002 is, or is included in, a system-on-chip ("SoC") along with one or more of the other components described herein below. For example, the SoC may include the processor 1002, a GPU, one or more of the network connectivity components 1006, and one or more of the sensor components 1008. In some configurations, the processor 1002 is fabricated, in part, utilizing a package-on-package ("PoP") integrated circuit packaging technique. The processor 1002 may be a single core or multi-core processor.

The processor 1002 may be created in accordance with an ARM architecture, available for license from ARM HOLDINGS of Cambridge, United Kingdom. Alternatively, the processor 1002 may be created in accordance with an x86 architecture, such as is available from INTEL CORPORATION of Mountain View, Calif. and others. In some configurations, the processor 1002 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 1004 include a random access memory ("RAM") 1014, a read-only memory ("ROM") 1016, an integrated storage memory ("integrated storage") 1018, and a removable storage memory ("removable storage") 1020. In some configurations, the RAM 1014 or a portion thereof, the ROM 1016 or a portion thereof, and/or some combination the RAM 1014 and the ROM 1016 is integrated in the processor 1002. In some configurations, the ROM 1016 is configured to store a firmware, an operating system or a portion thereof (e.g., operating system kernel), and/or a bootloader to load an operating system kernel from the integrated storage 1018 and/or the removable storage 1020.

The integrated storage 1018 can include a solid-state memory, a hard disk, or a combination of solid-state memory and a hard disk. The integrated storage 1018 may be soldered or otherwise connected to a logic board upon which the processor 1002 and other components described herein also may be connected. As such, the integrated storage 1018 is integrated in the computing device. The integrated storage 1018 is configured to store an operating system or portions thereof, application programs, data, and other software components described herein.

The removable storage 1020 can include a solid-state memory, a hard disk, or a combination of solid-state memory and a hard disk. In some configurations, the removable storage 1020 is provided in lieu of the integrated storage 1018. In other configurations, the removable storage 1020 is provided as additional optional storage. In some configurations, the removable storage 1020 is logically combined with the integrated storage 1018 such that the total available storage is made available as a total combined storage capacity. In some configurations, the total combined capacity of the integrated storage 1018 and the removable storage 1020 is shown to a user instead of separate storage capacities for the integrated storage 1018 and the removable storage 1020.

The removable storage 1020 is configured to be inserted into a removable storage memory slot (not shown) or other mechanism by which the removable storage 1020 is inserted and secured to facilitate a connection over which the removable storage 1020 can communicate with other components of the computing device, such as the processor 1002. The removable storage 1020 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 1004 can store an operating system. According to various configurations, the operating system includes, but is not limited to WINDOWS MOBILE OS from Microsoft Corporation of Redmond, Wash., WINDOWS PHONE OS from Microsoft Corporation, WINDOWS from Microsoft Corporation, PALM WEBOS from Hewlett-Packard Company of Palo Alto, Calif., BLACKBERRY OS from Research In Motion Limited of Waterloo, Ontario, Canada, IOS from Apple Inc. of Cupertino, Calif., and ANDROID OS from Google Inc. of Mountain View, Calif. Other operating systems are contemplated.

The network connectivity components 1006 include a wireless wide area network component ("WWAN component") 1022, a wireless local area network component ("WLAN component") 1024, and a wireless personal area network component ("WPAN component") 1026. The network connectivity components 1006 facilitate communications to and from the network 1056 or another network, which may be a WWAN, a WLAN, or a WPAN. Although only the network 1056 is illustrated, the network connectivity components 1006 may facilitate simultaneous communication with multiple networks, including the network 704 of FIG. 7. For example, the network connectivity components 1006 may facilitate simultaneous communications with multiple networks via one or more of a WWAN, a WLAN, or a WPAN.

The network 1056 may be or may include a WWAN, such as a mobile telecommunications network utilizing one or more mobile telecommunications technologies to provide voice and/or data services to a computing device utilizing the computing device architecture 1000 via the WWAN component 1022. The mobile telecommunications technologies can include, but are not limited to, Global System for Mobile communications ("GSM"), Code Division Multiple Access ("CDMA") ONE, CDMA7000, Universal Mobile Telecommunications System ("UMTS"), Long Term Evolution ("LTE"), and Worldwide Interoperability for Microwave Access ("WiMAX"). Moreover, the network 1056 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 1056 may be configured to provide voice and/or data communications with any combination of the above technologies. The network 1056 may be configured to or adapted to provide voice and/or data communications in accordance with future generation technologies.

In some configurations, the WWAN component 1022 is configured to provide dual-multi-mode connectivity to the network 1056. For example, the WWAN component 1022 may be configured to provide connectivity to the network 1056, wherein the network 1056 provides service via GSM and UMTS technologies, or via some other combination of technologies. Alternatively, multiple WWAN components 1022 may be utilized to perform such functionality, and/or provide additional functionality to support other non-compatible technologies (i.e., incapable of being supported by a single WWAN component). The WWAN component 1022 may facilitate similar connectivity to multiple networks (e.g., a UMTS network and an LTE network).

The network 1056 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 1024 is configured to connect to the network 1056 via the WI-FI access points. Such connections may be secured via various encryption technologies including, but not limited, WI-FI Protected Access ("WPA"), WPA2, Wired Equivalent Privacy ("WEP"), and the like.

The network 1056 may be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 1026 is configured to facilitate communications with other devices, such as peripherals, computers, or other computing devices via the WPAN.

The sensor components 1008 include a magnetometer 1028, an ambient light sensor 1030, a proximity sensor 1032, an accelerometer 1034, a gyroscope 1036, and a Global Positioning System sensor ("GPS sensor") 1038. It is contemplated that other sensors, such as, but not limited to, temperature sensors or shock detection sensors, also may be incorporated in the computing device architecture 1000.

The magnetometer 1028 is configured to measure the strength and direction of a magnetic field. In some configurations the magnetometer 1028 provides measurements to a compass application program stored within one of the memory components 1004 in order to provide a user with accurate directions in a frame of reference including the cardinal directions, north, south, east, and west. Similar measurements may be provided to a navigation application program that includes a compass component. Other uses of measurements obtained by the magnetometer 1028 are contemplated.

The ambient light sensor 1030 is configured to measure ambient light. In some configurations, the ambient light sensor 1030 provides measurements to an application program stored within one the memory components 1004 in order to automatically adjust the brightness of a display (described below) to compensate for low-light and high-light environments. Other uses of measurements obtained by the ambient light sensor 1030 are contemplated.

The proximity sensor 1032 is configured to detect the presence of an object or thing in proximity to the computing device without direct contact. In some configurations, the proximity sensor 1032 detects the presence of a user's body (e.g., the user's face) and provides this information to an application program stored within one of the memory components 1004 that utilizes the proximity information to enable or disable some functionality of the computing device. For example, a telephone application program may automatically disable a touchscreen (described below) in response to receiving the proximity information so that the user's face does not inadvertently end a call or enable/disable other functionality within the telephone application program during the call. Other uses of proximity as detected by the proximity sensor 1032 are contemplated.

The accelerometer 1034 is configured to measure proper acceleration. In some configurations, output from the accelerometer 1034 is used by an application program as an input mechanism to control some functionality of the application program. For example, the application program may be a video game in which a character, a portion thereof, or an object is moved or otherwise manipulated in response to input received via the accelerometer 1034. In some configurations, output from the accelerometer 1034 is provided to an application program for use in switching between landscape and portrait modes, calculating coordinate acceleration, or detecting a fall. Other uses of the accelerometer 1034 are contemplated.

The gyroscope 1036 is configured to measure and maintain orientation. In some configurations, output from the gyroscope 1036 is used by an application program as an input mechanism to control some functionality of the application program. For example, the gyroscope 1036 can be used for accurate recognition of movement within a 3D environment of a video game application or some other application. In some configurations, an application program utilizes output from the gyroscope 1036 and the accelerometer 1034 to enhance control of some functionality of the application program. Other uses of the gyroscope 1036 are contemplated.

The GPS sensor 1038 is configured to receive signals from GPS satellites for use in calculating a location. The location calculated by the GPS sensor 1038 may be used by any application program that requires or benefits from location information. For example, the location calculated by the GPS sensor 1038 may be used with a navigation application program to provide directions from the location to a destination or directions from the destination to the location. Moreover, the GPS sensor 1038 may be used to provide location information to an external location-based service, such as E911 service. The GPS sensor 1038 may obtain location information generated via WI-FI, WIMAX, and/or cellular triangulation techniques utilizing one or more of the network connectivity components 1006 to aid the GPS sensor 1038 in obtaining a location fix. The GPS sensor 1038 may also be used in Assisted GPS ("A-GPS") systems.

The I/O components 1010 include a display 1040, a touchscreen 1042, a data I/O interface component ("data I/O") 1044, an audio I/O interface component ("audio I/O") 1046, a video I/O interface component ("video I/O") 1048, and a camera 1050. In some configurations, the display 1040 and the touchscreen 1042 are combined. In some configurations two or more of the data I/O component 1044, the audio I/O component 1046, and the video I/O component 1048 are combined. The I/O components 1010 may include discrete processors configured to support the various interface described below, or may include processing functionality built-in to the processor 1002.

The display 1040 is an output device configured to present information in a visual form. In particular, the display 1040 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display 1040 is a liquid crystal display ("LCD") utilizing any active or passive matrix technology and any backlighting technology (if used). In some configurations, the display 1040 is an organic light emitting diode ("OLED") display. Other display types are contemplated.

The touchscreen 1042, also referred to herein as a "touch-enabled screen," is an input device configured to detect the presence and location of a touch. The touchscreen 1042 may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some configurations, the touchscreen 1042 is incorporated on top of the display 1040 as a transparent layer to enable a user to use one or more touches to interact with objects or other information presented on the display 1040. In other configurations, the touchscreen 1042 is a touch pad incorporated on a surface of the computing device that does not include the display 1040. For example, the computing device may have a touchscreen incorporated on top of the display 1040 and a touch pad on a surface opposite the display 1040.

In some configurations, the touchscreen 1042 is a single-touch touchscreen. In other configurations, the touchscreen 1042 is a multi-touch touchscreen. In some configurations, the touchscreen 1042 is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures may be implemented in software for use with the touchscreen 1042. As such, a developer may create gestures that are specific to a particular application program.

In some configurations, the touchscreen 1042 supports a tap gesture in which a user taps the touchscreen 1042 once on an item presented on the display 1040. The tap gesture may be used for various reasons including, but not limited to, opening or launching whatever the user taps. In some configurations, the touchscreen 1042 supports a double tap gesture in which a user taps the touchscreen 1042 twice on an item presented on the display 1040. The double tap gesture may be used for various reasons including, but not limited to, zooming in or zooming out in stages. In some configurations, the touchscreen 1042 supports a tap and hold gesture in which a user taps the touchscreen 1042 and maintains contact for at least a pre-defined time. The tap and hold gesture may be used for various reasons including, but not limited to, opening a context-specific menu.

In some configurations, the touchscreen 1042 supports a pan gesture in which a user places a finger on the touchscreen 1042 and maintains contact with the touchscreen 1042 while moving the finger on the touchscreen 1042. The pan gesture may be used for various reasons including, but not limited to, moving through screens, images, or menus at a controlled rate. Multiple finger pan gestures are also contemplated. In some configurations, the touchscreen 1042 supports a flick gesture in which a user swipes a finger in the direction the user wants the screen to move. The flick gesture may be used for various reasons including, but not limited to, scrolling horizontally or vertically through menus or pages. In some configurations, the touchscreen 1042 supports a pinch and stretch gesture in which a user makes a pinching motion with two fingers (e.g., thumb and forefinger) on the touchscreen 1042 or moves the two fingers apart. The pinch and stretch gesture may be used for various reasons including, but not limited to, zooming gradually in or out of a website, map, or picture.

Although the above gestures have been described with reference to the use one or more fingers for performing the gestures, other appendages such as toes or objects such as styluses may be used to interact with the touchscreen 1042. As such, the above gestures should be understood as being illustrative and should not be construed as being limiting in any way.

The data I/O interface component 1044 is configured to facilitate input of data to the computing device and output of data from the computing device. In some configurations, the data I/O interface component 1044 includes a connector configured to provide wired connectivity between the computing device and a computer system, for example, for synchronization operation purposes. The connector may be a proprietary connector or a standardized connector such as USB, micro-USB, mini-USB, or the like. In some configurations, the connector is a dock connector for docking the computing device with another device such as a docking station, audio device (e.g., a digital music player), or video device.

The audio I/O interface component 1046 is configured to provide audio input and/or output capabilities to the computing device. In some configurations, the audio I/O interface component 1046 includes a microphone configured to collect audio signals. In some configurations, the audio I/O interface component 1046 includes a headphone jack configured to provide connectivity for headphones or other external speakers. In some configurations, the audio I/O interface component 1046 includes a speaker for the output of audio signals. In some configurations, the audio I/O interface component 1046 includes an optical audio cable out.

The video I/O interface component 1048 is configured to provide video input and/or output capabilities to the computing device. In some configurations, the video I/O interface component 1048 includes a video connector configured to receive video as input from another device (e.g., a video media player such as a DVD or BLURAY player) or send video as output to another device (e.g., a monitor, a television, or some other external display). In some configurations, the video I/O interface component 1048 includes a High-Definition Multimedia Interface ("HDMI"), mini-HDMI, micro-HDMI, DisplayPort, or proprietary connector to input/output video content. In some configurations, the video I/O interface component 1048 or portions thereof is combined with the audio I/O interface component 1046 or portions thereof.

The camera 1050 can be configured to capture still images and/or video. The camera 1050 may utilize a charge coupled device ("CCD") or a complementary metal oxide semiconductor ("CMOS") image sensor to capture images. In some configurations, the camera 1050 includes a flash to aid in taking pictures in low-light environments. Settings for the camera 1050 may be implemented as hardware or software buttons.

Although not illustrated, one or more hardware buttons may also be included in the computing device architecture 1000. The hardware buttons may be used for controlling some operational aspect of the computing device. The hardware buttons may be dedicated buttons or multi-use buttons. The hardware buttons may be mechanical or sensor-based.

The illustrated power components 1012 include one or more batteries 1052, which can be connected to a battery gauge 1054. The batteries 1052 may be rechargeable or disposable. Rechargeable battery types include, but are not limited to, lithium polymer, lithium ion, nickel cadmium, and nickel metal hydride. Each of the batteries 1052 may be made of one or more cells.

The battery gauge 1054 can be configured to measure battery parameters such as current, voltage, and temperature. In some configurations, the battery gauge 1054 is configured to measure the effect of a battery's discharge rate, temperature, age and other factors to predict remaining life within a certain percentage of error. In some configurations, the battery gauge 1054 provides measurements to an application program that is configured to utilize the measurements to present useful power management data to a user. Power management data may include one or more of a percentage of battery used, a percentage of battery remaining, a battery condition, a remaining time, a remaining capacity (e.g., in watt hours), a current draw, and a voltage.

The power components 1012 may also include a power connector, which may be combined with one or more of the aforementioned I/O components 1010. The power components 1012 may interface with an external power system or charging equipment via an I/O component.

Based on the foregoing, it should be appreciated that concepts and technologies have been disclosed herein that provide, among other techniques, enhanced control of one or more robots. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example configurations and applications illustrated and described, and without departing from the true spirit and scope of the present invention, which is set forth in the following claims.

What is claimed is:

1. A computer-implemented method, comprising:
    receiving, by an autonomous self-moving device from one or more sensors, one or more signals indicative of objects in a vicinity of the autonomous self-moving device, the autonomous self-moving device comprising a plurality of light emitting devices (LEDs);
    determining, by the autonomous self-moving device based at least in part on the one or more signals, a presence of a plurality of persons proximate to the autonomous self-moving device;
    determining, by the autonomous self-moving device, that a location of the autonomous self-moving device is within a threshold distance from a location of a set of the plurality of persons; and
    in response to determining that the location of the autonomous self-moving device is within the threshold distance from the location of the set of the plurality of persons:
    selecting, by the autonomous self-moving device, a set of the plurality of LEDs that are closest to a direction of the set of the plurality of persons;
    activating, by the autonomous self-moving device, the set of the plurality of LEDs to indicate that the autonomous self-moving device has detected the presence of the set of the plurality of persons;
    activating an additional indication on one of the set of the plurality of LEDs associated with one of the plurality of persons that is closest to the autonomous self-moving device, wherein the additional indication is different from indications activated on the set of the plurality of LEDs; and
    adjusting a brightness of the set of the plurality of LEDs based on a determined distance to the set of the plurality of persons.

2. The computer-implemented method of claim 1, further comprising activating a wearable device in response to determining that the location of the autonomous self-moving device is within the threshold distance from the location of the one of the plurality of persons, wherein the autonomous self-moving device causes one or more haptic devices of the wearable device to indicate the determined presence.

3. The computer-implemented method of claim 1, further comprising activating a projection device configured to render a projection comprising at least a portion of an environment proximate to the autonomous self-moving device in response to determining that the location of the autonomous self-moving device is within the threshold distance from the one of the plurality of persons, wherein the rendered projection includes an indication of the determined presence.

4. The computer-implemented method of claim 1, further comprising activating an additional device is configured to render a holographic image including at least a portion of an environment proximate to the autonomous self-moving device in response to determining that the location of the autonomous self-moving device is within the threshold distance from the location of the one of the plurality of persons, wherein rendered holographic image includes an indication of the determined presence.

5. The computer-implemented method of claim 1, further comprising:
receiving data from wearable devices associated with the plurality of persons; and
merging localization models for the wearable devices to determine that the location of the autonomous self-moving device is within the threshold distance.

6. The computer-implemented method of claim 1, further comprising activating a further indication on a selected indicator of the plurality of LEDs, the selected indicator indicative of an intended direction of movement of the autonomous self-moving device.

7. An autonomous self-moving device configured to:
receive one or more signals indicative of objects in a vicinity of the autonomous self-moving device, the autonomous self-moving device having a plurality of light emitting devices (LEDs);
determine, based at least in part on the one or more signals a presence of a plurality of persons proximate to the autonomous self-moving device;
determine that a location of the autonomous self-moving device is within a threshold distance from of a location of a set of the plurality of persons;
in response to determining that the location of the autonomous self-moving device is within the threshold distance from the location of the set of the plurality of persons, activating, by the autonomous self-moving device, a set of the plurality of LEDs to indicate that the autonomous self-moving device has detected the presence of the set of the plurality of persons;
activate an additional indication on one of the set of the plurality of LEDs associated with one of the plurality of persons that is closest to the autonomous self-moving device, wherein the additional indication is different from indications activated on the set of the plurality of LEDs; and
adjust a brightness of the set of the plurality of LEDs based on a determined distance to the set of the plurality of persons.

8. The autonomous self-moving device of claim 7, further configured to activate a wearable device, wherein one or more haptic devices of the wearable device is activated to indicate the determined presence.

9. The autonomous self-moving device of claim 7, further configured to activate a projection device configured to render a projection comprising at least a portion of an environment proximate to the autonomous self-moving device, wherein the rendered projection includes an indication of the determined presence.

10. The autonomous self-moving device of claim 7, further configured to generate a holographic image including at least a portion of an environment proximate to the autonomous self-moving device, wherein holographic image includes an indication of the determined presence.

11. The autonomous self-moving device of claim 7, further configured to:
receive data from wearable devices associated with the plurality of persons; and
merge localization models for the wearable devices to determine that the location of the autonomous self-moving device is within the threshold distance.

12. The autonomous self-moving device of claim 7, further configured to activate a further indication on a selected indicator of the plurality of LEDs, the selected indicator indicative of an intended direction of movement of the autonomous self-moving device.

13. An autonomous self-moving device comprising:
a plurality of LEDs;
a memory storing thereon instructions that when executed by a processor of the autonomous self-moving device, cause the autonomous self-moving device to perform operations comprising:
receiving, from one or more sensors, one or more signals indicative of objects in a vicinity of the autonomous self-moving device;
determining, based at least in part on the one or more signals, a presence of a plurality of persons proximate to the autonomous self-moving device;
determining, that a location of the autonomous self-moving device is within a threshold distance from a location of a set of the plurality of persons;
in response to determining that the location of the autonomous self-moving device is within the threshold distance from the location of the set of the plurality of persons, activating a first LED of the plurality of LEDs to indicate that the autonomous self-moving device has detected the presence of the set of the plurality of persons;
activating an additional indication on one of the set of the plurality of LEDs associated with one of the plurality of persons that is closest to the autonomous self-moving device, wherein the additional indication is different from indications activated on the set of the plurality of LEDs; and
adjusting a brightness of the set of the plurality of LEDs based on a determined distance to the set of the plurality of persons.

14. The autonomous self-moving device of claim 13, further comprising instructions that when executed by the processor of the autonomous self-moving device, cause the autonomous self-moving device to perform operations comprising activating a further indication on a selected indicator of the plurality of LEDs, the selected indicator indicative of an intended direction of movement of the autonomous self-moving device.

* * * * *